(12) United States Patent
Amihod et al.

(10) Patent No.: US 12,547,610 B2
(45) Date of Patent: *Feb. 10, 2026

(54) HIGH FREQUENCY DATA MANAGEMENT (HFDM)

(71) Applicant: Autodesk, Inc., San Francisco, CA (US)

(72) Inventors: Dov Amihod, Hampstead (CA); Thiago da Costa, Berkeley, CA (US); Arno Zinke, Bonn (DE); Sebastian Medan, Notre-Dame-de-l'ile-Perrot (CA); Farzad Towhidi, Montreal (CA); Roland Arthur Ruiters-Christou, Bonn (DE)

(73) Assignee: AUTODESK, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,232

(22) Filed: Jul. 6, 2023

(65) Prior Publication Data

US 2023/0367767 A1 Nov. 16, 2023

Related U.S. Application Data

(63) Continuation of application No. 17/034,515, filed on Sep. 28, 2020, now Pat. No. 11,741,084.
(Continued)

(51) Int. Cl.
*G06F 16/00* (2019.01)
*G06F 16/21* (2019.01)
(Continued)

(52) U.S. Cl.
CPC ........ *G06F 16/2379* (2019.01); *G06F 16/219* (2019.01); *G06F 16/2228* (2019.01);
(Continued)

(58) Field of Classification Search
CPC .......... G06F 16/2379; G06F 16/24573; G06F 16/219; G06F 16/2246; G06F 16/2228;
(Continued)

(56) References Cited

U.S. PATENT DOCUMENTS

| 5,504,900 A | 4/1996 | Raz |
| 10,042,782 B2 | 8/2018 | Struttmann |

(Continued)

FOREIGN PATENT DOCUMENTS

| WO | 2008064901 | 6/2008 |
| WO | 2014036054 | 3/2014 |

(Continued)

OTHER PUBLICATIONS

P. Bhattacharya et al., "Graph-based analysis and prediction for software evolution", 2012 34th International Conference on Software Engineering (ICSE) (2012, pp. 419-429).*

(Continued)

*Primary Examiner* — Srirama Channavajjala
(74) *Attorney, Agent, or Firm* — Gates & Cooper LLP

(57) ABSTRACT

A method and system provide the ability to manage data. Property sets consisting of property set objects are created. A commit graph stores the property set objects and provides a topology of changes between states of the objects as commit nodes. Change sets represent a change between two commit nodes. Each change set specifies a basic operation that was applied on each state to get to a next state of the property set objects and each change set is reversible.

20 Claims, 14 Drawing Sheets

Related U.S. Application Data

(60) Provisional application No. 62/907,173, filed on Sep. 27, 2019.

(51) Int. Cl.
*G06F 16/22* (2019.01)
*G06F 16/23* (2019.01)
*G06F 16/2455* (2019.01)
*G06F 16/2457* (2019.01)
*G06N 7/01* (2023.01)

(52) U.S. Cl.
CPC ...... *G06F 16/2246* (2019.01); *G06F 16/2322* (2019.01); *G06F 16/2393* (2019.01); *G06F 16/2455* (2019.01); *G06F 16/24573* (2019.01); *G06N 7/01* (2023.01)

(58) Field of Classification Search
CPC ............. G06F 16/2455; G06F 16/2322; G06F 16/2393; G06N 7/01
See application file for complete search history.

(56) References Cited

U.S. PATENT DOCUMENTS

| | | | |
|---|---|---|---|
| 10,121,019 B2 | 11/2018 | Struttmann | |
| 10,296,403 B2 | 5/2019 | Cook et al. | |
| 10,303,469 B1 | 5/2019 | Neatherway et al. | |
| 10,713,608 B2 | 7/2020 | Goja | |
| 10,743,133 B2 | 8/2020 | Freeland et al. | |
| 11,741,084 B2 * | 8/2023 | Amihod | G06F 16/219 707/802 |
| 2009/0030921 A1 | 1/2009 | Kadiyska et al. | |
| 2009/0313331 A1 | 12/2009 | Rasmussen et al. | |
| 2009/0327255 A1 * | 12/2009 | Larson | G06F 16/8365 707/999.102 |
| 2010/0174694 A1 * | 7/2010 | Staebler | G06F 16/2358 707/703 |
| 2012/0233589 A1 | 9/2012 | Mruthyunjaya et al. | |
| 2014/0068639 A1 | 3/2014 | Schrock et al. | |
| 2014/0279903 A1 | 9/2014 | Hsiao et al. | |
| 2014/0297592 A1 * | 10/2014 | Ohtake | G06F 8/71 707/638 |
| 2014/0372963 A1 * | 12/2014 | Chandaria | G06F 8/00 717/100 |
| 2017/0212751 A1 | 7/2017 | Mak et al. | |
| 2017/0269909 A1 | 9/2017 | Smith et al. | |
| 2017/0293697 A1 | 10/2017 | Youshi et al. | |
| 2018/0205552 A1 | 7/2018 | Struttmann et al. | |
| 2019/0050814 A1 | 2/2019 | Surkov et al. | |
| 2019/0303579 A1 | 10/2019 | Reddy et al. | |
| 2019/0332861 A1 | 10/2019 | Biswas et al. | |
| 2020/0356449 A1 | 11/2020 | Bensberg et al. | |

FOREIGN PATENT DOCUMENTS

| | | |
|---|---|---|
| WO | 2014120270 | 8/2014 |
| WO | WO2015006075 A1 * | 1/2015 |
| WO | 2018006072 | 1/2018 |

OTHER PUBLICATIONS

Maximilian Steff et al., "Commit graphs", 2013 1st International Workshop on Data Analysis Patterns in Software Engineering (DAPSE) (2013, pp. 4-5).*

Chacon, S., et al., "Pro Git", The Experts Voice, 2nd Edition 2014, pp. 1-517.

Crooks, N., et al., "TARDiS: A Branch-and-Merge Approach to Weak Consistency", Proceedings of the 2016 International Conference on Management of Data, Jun. 2016, pp. 1615-1628.

Lorenz, D.H., et al., "Versionable, Branchable, and Mergeable Application State", Proceedings of the 2014 ACM International Symposium on New Ideas, New Paradigms, and Reflections on Programming & Software, Oct. 2014, pp. 29-42.

AWS AppSync Developer Guide, Amazon Web Services, Inc., 2020, pp. 1-364, docs.aws.amazon.com/appsync/latest/devguide, as downloaded Sep. 20, 2020.

share.js, github.com/josephg/ShareJS, 2014, pp. 1-12, as downloaded Sep. 20, 2020.

Google Cloud Firestore, Aug. 2020, pp. 1-4, firebase.google.com/docs/firestore, as downloaded Sep. 20, 2020.

Maddox, M., et al., "Decibel: The Relational Dataset Branching System", Proceedings of the VLDB Endowment, 2016, pp. 624-635, vol. 9, No. 9.

Vagena, Z., et al., "Supporting Branched Versions on XML documents", 14th International Workshop Research Issues on Data Engineering: Web Services for e-Commerce and e-Government Applications, 2004, pp. 1-8.

Goland, Y., "The block chain and the CAP Theorem", Mar. 8, 2017, pp. 1-9, http://www.goland.org/blockchain_and_cap/, as downloaded Sep. 20, 2020.

Kernfeld, P., "How Bitcoin Loses to the CAP Theorem", Jan. 2016, pp. 1-4, https://paulkernfeld.com/2016/01/15/bitcoin-cap-theorem.html, as downloaded Sep. 20, 2020.

Jouini, K., et al., "Design and Analysis of Index Structures in MultiVersion Data Warehouses", New Trends in Data Warehousing and Data Analysis, Annals of Information Systems, 2009, pp. 1-21, vol. 3.

Tzouramams, T, et al., "Overlapping B+-Trees: An Implementation of a Transaction Time Access Method", Data & Knowledge Engineering, 1999, pp. 381-404, vol. 29.

Jiang, L., et al., "The BT-Tree: A Branched and Temporal Access Method", Proceedings of the 26th International Conference on Very Large Data Bases, 2000, pp. 1-10.

J. Baillieul et al., "The combinatorial graph theory of structured formations", 2007 46th IEEE Conference on Decision and Control, Dec. 2007, pp. 3609-3615.

Cosnard, M. et al., "Automatic task graph generation techniques", Proceedings of the Twenty-Eighth Annual Hawaii International Conference on System Sciences (vol. 2, pp. 113-122 vol. 2).

Franz-Xaver Geiger et al., "A Graph-based Dataset of Commit History of Real-World Android apps", Gothenburg, Sweden, MSR' 18, May 28-29, 2018, pp. 1-4.

Cheng Thao et al., "Using Versioned Tree Data Structure, Change Detection and Node Identity for Three-Way XML Merging", Doc Eng '10: Proceedings of the 10th ACM symposium on Document engineering, Sep. 2010, pp. 77-86.

Maximilian Steff et al., " Commit Graphs", 2013 1st International Workshop on Data Analysis Patterns in Software Engineering, DAPSE, May 2013, pp. 4-5.

* cited by examiner

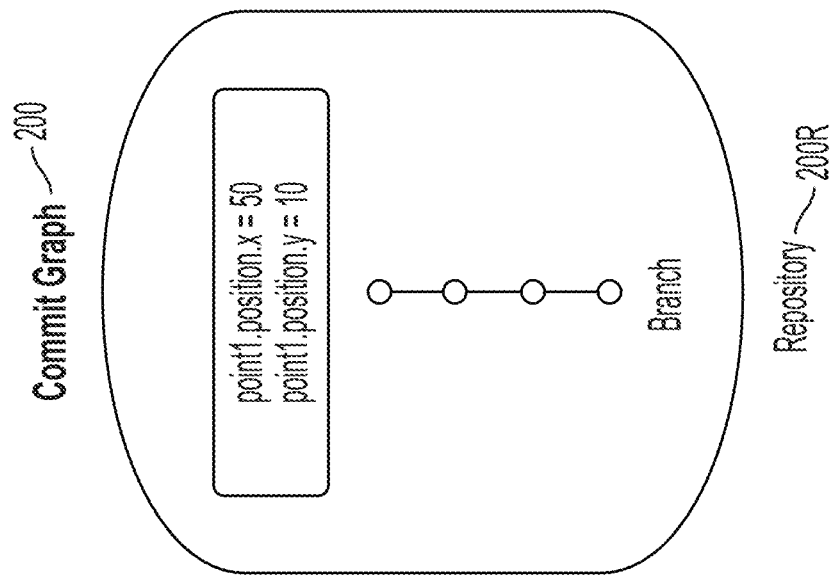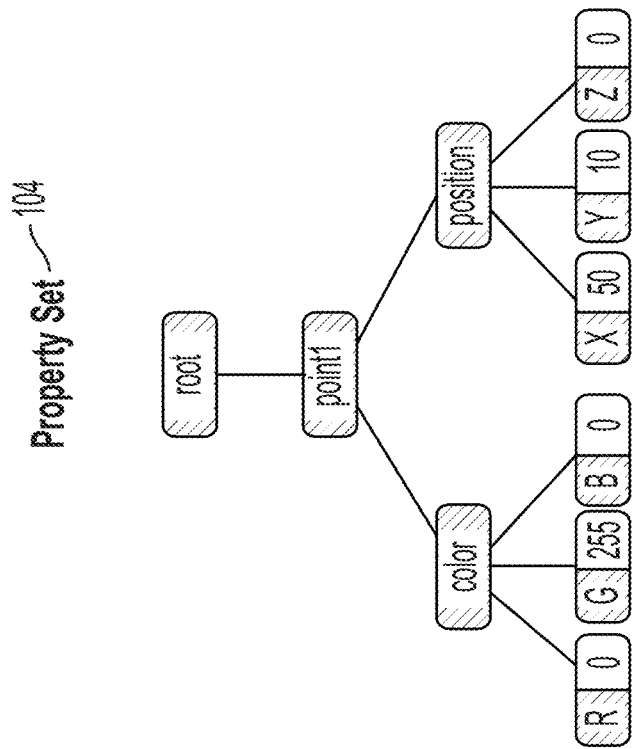
FIG. 4

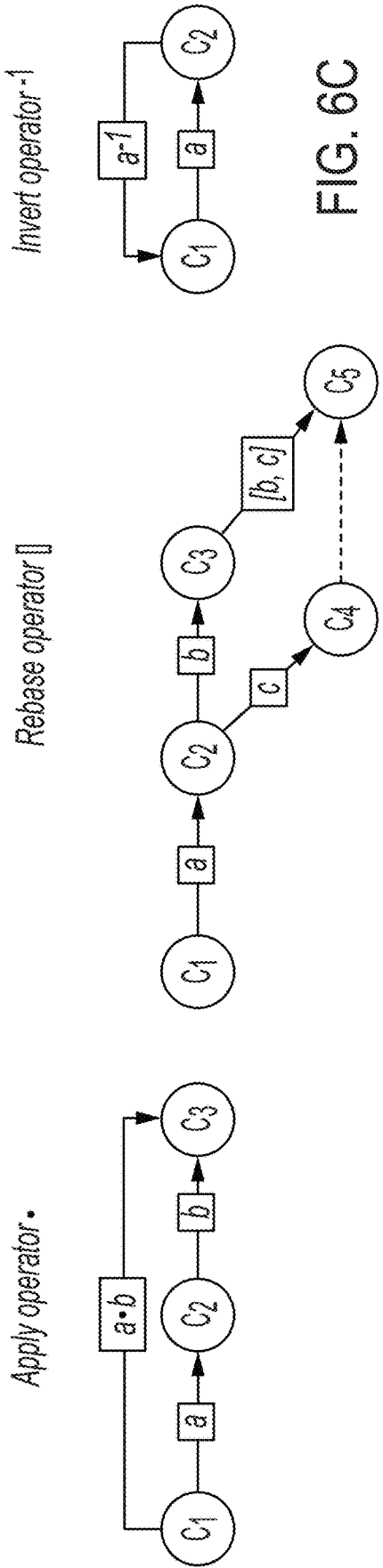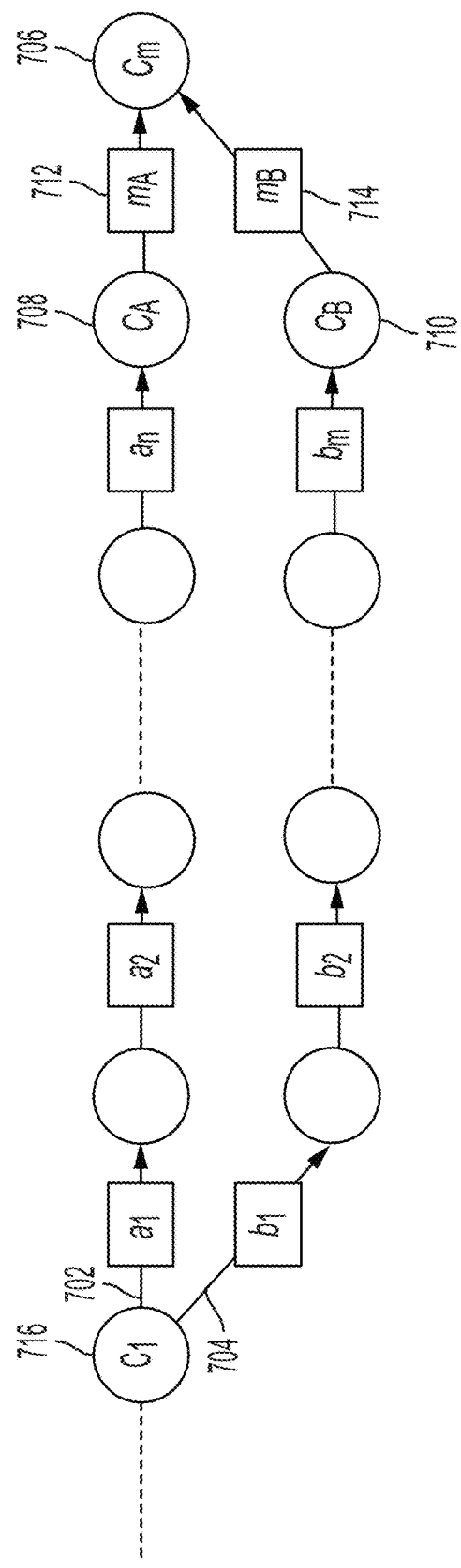

HIGH FREQUENCY DATA MANAGEMENT (HFDM)

CROSS-REFERENCE TO RELATED APPLICATIONS

This application is a continuation under 35 U.S.C. § 120 of application Ser. No. 17/034,515, filed on Sep. 28, 2020, now issued as U.S. Pat. No. 11,741,084 on Aug. 29, 2023, with inventor(s) Dov Amihod, Thiago daCosta, Arno Zinke, Sebastian Medan, Farzad Towhidi, and Roland Arthur Ruiters-Christou, entitled "High Frequency Data Management (HFDM)," which application is incorporated by reference herein, and which application claims the benefit under 35 U.S.C. Section 119 (e) of the following commonly-assigned U.S. provisional patent application(s), which is incorporated by reference herein: Provisional Application Ser. No. 62/907,173, filed on Sep. 27, 2019, with inventor(s) Dov Amihod, Thiago da Costa, Arno Zinke, Sebastian Medan, Farzad Towhidi, and Roland Artur Ruiters-Christou, entitled "High Frequency Data Model (HFDM)".

BACKGROUND OF THE INVENTION

1. Field of the Invention

The present invention relates generally to collaborative design, and in particular, to a method, apparatus, system, and article of manufacture for a high frequency data management system that solves latency and user workflow issues.

2. Description of the Related Art

The (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

Collaborative design is becoming a bigger area and accepted workflow. The number of users on any one project can expand very quickly and result in changes and forks, that can slow performance and complicate the workflow. Prior art collaborative systems fail to store data in an efficient, fast, and accessible manner that can be utilized by multiple users in a collaborative system. More specifically, it is desirable to store data in a manner that is performed in an automated manner, that is efficient and processed quickly both across a network and locally, with simultaneous access to collaborating users, where version history and reversion are available. To better understand these problems, a description of prior art data management systems and their limitations may be useful.

Various types of applications (e.g., content creation applications) impose demanding requirements on their data infrastructure. Data grows larger over the lifetime of assets, projects and companies. There are intense sharing/collaborative challenges, with very high-expectations with regards to low latency, real-time feedback, data-availability and durability. Further, many people simply don't know they have a problem with keeping history for the content they generate. Specifically, many types of applications require the history of data to be preserved—for example financial applications, document management applications or content creation applications. The most challenging applications to build are modern content creation applications in the web.

Users expect their work to be always saved, and that it can be reverted to earlier versions. Users may go offline for periods of time and need to reconcile multiple versions of documents—by multiple collaborators. They also expect real-time collaborative editing, like in GOOGLE DOCS, and an interactive application that quickly reacts to changes.

Such a requirement of historical data imposes high demands on the data infrastructure of such applications. For example, a distributed system may have several distributed nodes that have to be synchronized—sometimes in real time, sometimes after long periods of time. Such a system must cope with a high rate of data changes (at the speed of key presses or mouse movements), and needs to support rich data-models such as the ones needed for web-page editors, CAD applications or document editors. In addition, such systems may have to cope with large amounts of data and provide high availability and durability.

To realize such applications, it would be useful to have a system that allows the following functionality to be realized at the same time: a) complete change history, b) client-level state while globally eventually consistent, c) branching & merging of change histories, d) random access to all data, e) efficient access to the state of all data at any point in history.

Many products that create content have their data-backends designed without knowledge of these problems/design requirements. Most products approach data management for content as a virtual file system. This approach kicks off a chain of future problems and limitations with regards to management of user generated content in the presence of concurrent editing. Please note that this includes not only multi-user collaboration use cases but also scenarios where services produce or consume data, particularly in the context of a distributed computer.

There are several systems that implement a subset of the requirements defined above. For example, AWS APPSYNC [4], SHARE.JS [5] AND GOOGLE CLOUD FIRESTORE [6] implement a distributed system with a local state and conflict resolution logic to handle competing writes, but they don't provide complete change history with branching. On the other hand, there are systems that provide full version history with branching on complex data-structures, for example for SQL databases [7] or XML documents [8], but which are not implemented as distributed systems.

Prior art systems may provide a class of distributed data storage systems that make history their primary concern (GIT [1] and BLOCKCHAIN). However, such change-based systems operate on the basis of storing data-changes.

One may also note that the above described requirements seem to be interdependent. Change-based data systems seem to suffer from the same set of challenges—for example random data access is difficult while encoding history—which warrants studying these systems as a class of systems. Achieving one requirement does not guarantee one can achieve the next requirement.

More specifically, GIT [1] provides a distributed revision control system, that uses local states on the clients and uses branching and merging/rebasing to achieve eventual consistency. However, GIT's main use case is versioning of source code. It therefore manages a folder tree, instead of a more fine-grained document model of embodiments of the present invention. Further, GIT focuses on the low frequency use cases, in which usually only a few synchronizations per day happen, instead of constantly keeping multiple nodes in sync.

TARDiS [2] also follows an approach where clients have a local state and branches. Conflicts are resolved via merges between these branches. TARDiS may be designed for smaller high frequency transactions, and uses history and branches only for collision detection and not as a primary concept in the system. TARDiS' branches are only created when two writes conflict and not explicitly by the user. Further, TARDiS' history is deleted by the garbage collection when it is no longer needed. However, TARDiS does not utilize a hierarchical data model—it uses a flat key-value store and does not have inbuilt support for operational transforms. TARDiS stores changes for each key separately, which means that it is expensive to get all changes between two states and that a traversal of the ordered list of changes per key is needed to determine the value of a key at a certain state.

VERCAST [3] is a system to synchronize the state between multiple distributed applications. It uses branches, preserves history in a persisted tree and resolves conflicts via merging. However, VERCAST does not provide a standardized data model, but is instead implemented as an application framework. VERCAST's users can implement their own data types that can implement custom patching and conflict detection methods. However, these patches have to be commutative, there is no inbuilt support for operational transforms.

Blockchain based systems also implement a distributed system where all nodes can have a branching local state. However, in contrast to a more centralized system, Blockchain uses a distributed consensus protocol, often based on proof-of-work or proof-of-stake, to decide which changes finally get included in the main branch.

In view of the above, what is needed is a system that provides the following functionality to be realized at the same time: a) complete change history, b) client-level state while globally eventually consistent, c) branching & merging, d) random access to all data, e) efficient access to the state of all data at any point in history.

SUMMARY OF THE INVENTION

Embodiments of the invention provide the ability to store data while describing a data structure, with the system storing the data for you. Such a capability is provided using as little bandwidth as possible, with low latency as physically possible, fast read-write access, simultaneous read/write access across multiple collaborating users and services, meaningful structure and partitioning of the data, data locking as a feature but not a technology limitation, and version history for the data with available operations such as reverting to a specific change made in the past.

To enable such capability, embodiments of the invention store the data in a commit graph in a data structure referred to as a property set with deltas/changes between different states of the data recorded in change sets.

BRIEF DESCRIPTION OF THE DRAWINGS

Referring now to the drawings in which like reference numbers represent corresponding parts throughout:

FIG. 4 illustrates how changes made on the data are tracked as ChangeSets within a CommitGraph on a single branch in accordance with one or more embodiments of the invention;

FIGS. 6A-6C illustrate the basic operations of HFDM ChangeSets in accordance with one or more embodiments of the invention;

FIG. 7 illustrates merging branches in accordance with one or more embodiments of the invention;

DETAILED DESCRIPTION OF THE PREFERRED EMBODIMENTS

Figure 1:
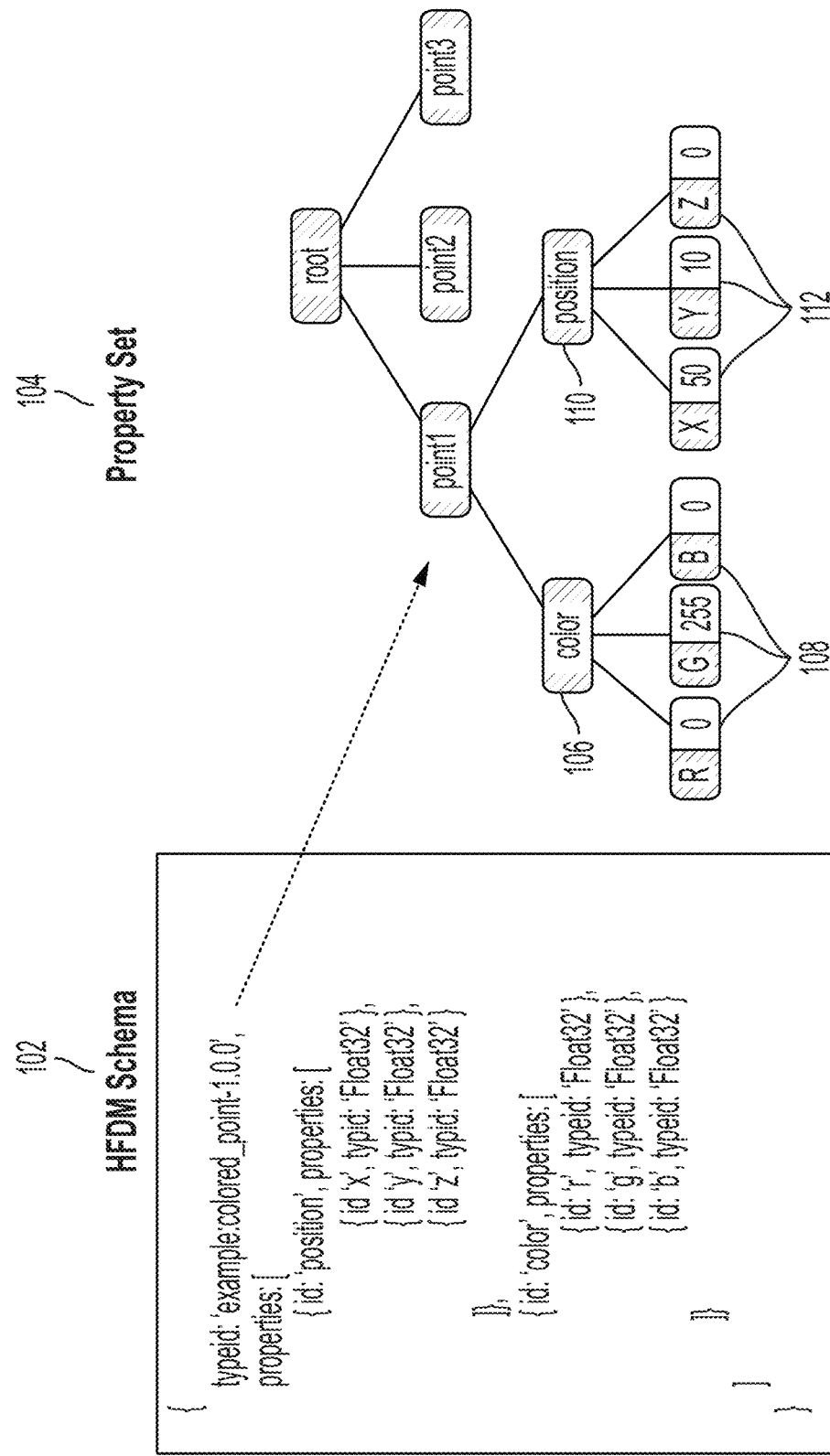
FIG. 1 illustrates an exemplary HFDM schema and a property set defined based thereon in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.
Motivation The majority of content creation applications (CAD, OFFICE Document, Spreadsheets, Video, Audio, Forms, etc.) will involve a certain amount of client side and server side computation. For example, a two-dimensional (2D) or three-dimensional (3D) design product may be composed of a client-application with real-time editing features, and cloud services (for example machine learning, rendering, geometry or image generation). In the presence of high latency/low bandwidth environments, whenever possible, a granular, partial update of results is preferable to provide fast feedback to the user. This applies to use cases involving server side compute as well as to multi-user simultaneous document editing. In all these cases data is continuously changing and the traditional approach of manual "save events" becomes a workflow bottleneck.

Instead, data needs to be persisted and shared at a granular (change) level and distributed applications must be designed to react to data changing in real-time (at a high-frequency). Different collaborators may require different parts of the dataset, or concurrently write to the same data structures.

For efficiency reasons, content creation applications require a highly stateful design. Even for simple document editing application such as GOOGLE DOCS, this statefulness and the fact that data is being manipulated by multiple parties makes it very challenging to implement a scalable solution.

Prior art systems that provide varying capabilities include SQL, No-SQL, in memory databases (DBs), document DBs, graph databases, hybrid databases (e.g., the ARANGO database), version control systems (e.g., the GIT system), and databases (e.g., SQLITE/LITETREE) featuring certain GIT-like features. While first foundational collaboration elements may exist, the prior art fails to provide a holistic solution. Such a solution, however, is critical for delivering complex content creation products and connected downstream workflows that are likely to be utilized.

System Level Overview

Embodiments of the invention provide a system that enables a highly collaborative workflow, where data is shared between different parties and different applications and which, moreover, is delivered through a mix of edge and cloud compute. Regardless of the content created (e.g. engineering content, spreadsheets, a game, a construction software), embodiment of the invention provide one or more of the following features:

1. History—The history of changes must be kept. Changes may need to be reversed, and the user may need to access any previous state. The history of changes must be immutable to guarantee data consistency and to provide a trusted audit trail.
2. High Frequency—The user-content may be generated at a high frequency. For example changes to parameters of a design, keystrokes in a document editor, the mouse-movement itself, or even the positions of people on a map may be changing at a high-frequency and need to be persisted and potentially shared with other collaborators with low latency.
3. Performance—Performance of insertion, deletion, modification of data must be sustained even after billions of changes to the same data set.
4. Conflict detection and resolution—Users desire real-time collaborative features, for example simultaneous editing of the same data from multiple applications where different actors modify the same data structures. For example, multiple users and/or services may be interacting with data simultaneously—which may cause data level, application level or semantic conflicts. Ideally, data level conflicts would be detected and resolved without any user intervention. While automated conflict resolution is preferable in most situations, optional custom conflict resolution needs to be available.
5. Partial data access—The processing of data is distributed. Services and clients may require access to different parts of a potentially large data set. To reduce load, clients may decide to only load parts of the whole data set.
6. Rich, custom data models—Supporting rich data models is useful and may be critical. This includes static and dynamic data structures, references, containers as well as the ability to create new or extend existing data types through inheritance and composition. In addition, to ensure data consistency, type schemas need to be versioned and older versions of a schema need to be persisted alongside with the data.
7. Branching and merging—Users want to create branches/make variations of content and merge them back seamlessly.
8. Compact representation—Data transfer is a major concern. Datasets are changed and created at a high frequency. Transferring data back and forth introduces latency impacting the user-experience. In some cases, latency can make a product inviable.
9. Offline/online—The application will need to support offline & online use cases including situations with unstable cloud connectivity.
10. Resilience—Users expect their services to be available 24/7, without data loss.
11. Data Retention—Users will want to control how their data will be used. They have expectations of privacy, and their data is protected by law in many countries. It is no longer sufficient to naively store user content without ensuring its confidentiality and integrity or give control back to the user.
12. Reactive, data-driven compute—Users want the ability to trigger computations based on specific data changes. In the case of highly stateful applications and services this requires granular data binding capabilities and, for performance and scalability reasons, a local copy of the relevant data state, transparently managed by the system. This means that in such cases a "thick" client-side SDK is required.
13. Atomic changes—It is important to guarantee atomicity of data changes. Often these changes affect multiple data sets (documents), with their own history.
14. Eventual consistency—All changes need to be eventually consistent and (stateful) clients as well as services operating on the same data set need to stay in sync.
15. Searchability—The ability to query and search data efficiently is a must. Please note that, depending on the use case, different query types are required. For example, SQL is popular to create views from relational data, whereas efficient range queries or graph queries require specialized databases/indices. Hence, separating the query from the persistence layer is highly desirable.
16. Single source of truth—While not all data is structured and not all data will be stored in a single physical database, the system should be able to serve as a "a single source of truth" for collaborative workflows.

There is no single publicly available prior art database solution providing all of the above features (e.g., an industrial scale infrastructure with this these properties).

Many businesses rely entirely on the capability of creating content. As tools become more connected, building a capable (non-file centric) data backend for products that are used by millions of people is very hard. Embodiments of the invention (referred to herein ad High Frequency Data Management [HFDM]) provide a formalized single architecture that is capable supplying all of the above-identified needs.

Change History

History is an essential part of the creative process. Much of the problems with just using a database (DB) arise from the fact that most DB systems do not store any history at all. When history is kept, it is often kept in the form of a log and making that log useful for change management is cumbersome. Logs in DBs mostly serve the purpose of backup. Making a DB keep a history of related content is not a trivial problem (there are not simple values changing independently). Making that history useful (performant and compact), is even harder. Most notably: DBs assume a linear history (a log is a linear history mostly done via a timestamp or monotonic counter). While this approach works well in single user scenarios, implementing an efficient per user branch history is far from trivial.

It may be noted that the most difficult challenge with keeping history, is how the history is kept, and what can be done with it. By "history", embodiments of the invention do not only mean the events that led to a data change (history not in the sense of a log or an event source pattern), but rather the fundamental state of the data at different points in time. This aspect is crucial in cases where collaborators may join and leave branches representing a shared data state.

There are few options to encode history. One option would be to encode the variables of the objects involved. For example position and color are two variables. One can encode (i) per variable at monotonically increasing points of time where a variable position may encode a version number such as $p_1 \ldots p_n$, and $c_1 \ldots c_n$, or (ii) for the whole system where position and color are encoded together therefore $(c,p)_1 \ldots (c,p)_n$.

In the real world, variables do not change at the same rate. For example, the position of a point might change very quickly while it is dragged, the color only rarely when the user selects a new color. Every time the point is moved, the new position p may be saved to the database. This way a linear history of changes of the variable $p_1 \ldots p_1$, is maintained. If one also makes a change to the color, then $c_1 \ldots c_n$ may be maintained, where the color changes are stored at different points in time. Now, how is one supposed to reconstruct a state S that provides both p and c at time T? If the histories are stored independently, the only option would be to timestamp the samples and execute a search to find out what was the value of p and c at time T. Now suppose that one wants to capture the history of a mesh with millions of points—this search has to be done for every variable independently, which takes a long time O(N) for the number of variables and O(log N) for the number of versions.

In reality, one often also must add and remove additional variables to the system. For example, one may add or remove points to/from the mesh. This requires an enclosure of variables (a document) to be kept. This can be done by adding an index to track the variables that belong to such an enclosure—for example how does one know that the enclosure now has $d_1$? The index would need to be updated to record all objects that are added to the enclosure (so when search is executed the objects can be found if they intersect the time T)— making this index grow indefinitely. Even worse: when an object is removed from the enclosure it is not possible to remove the object from the index as you would never be able to find it if it was once part of the enclosure. Versioning the index itself poses another set of problems.

For the reasons stated above, embodiments of the invention utilize option (ii), where states of the full system are encoded at different points in time. However, storing a copy of the full system explicitly for each state, would be far too expensive. At each state only a small number of variables may change and this would incur a large storage cost. So instead, embodiments of the invention only store the changes between the previous state and the next state.

History and Branches

When one observes the evolution of a document—for example a text document—it seems that history is in fact non-linear. Logically a document must be the union of all changes made to it by all individuals. For example, a document may be shared with two individuals that then make changes to the document. If one now considers merging the changes back from the two individuals, the new copy will contain the two histories of the two individuals. In essence, there was a point in time where history diverged, and then it converged at the merge point.

The history of multiple objects that are related must be the union of all changes to all of the objects in that group of objects. Per-object history legitimately defeats branching (or makes it completely impractical to manage efficiently) as a copy of the entire state must be made at the branching point—or at least an index of the state of all objects at that point in time must be created. This makes the system very inefficient.

Per Problem Database Use

Productive applications generally create structured data together with chunks of unstructured data like large buffers of image or geometry data). The data tends to be typed and the actual data types tend to have a certain semantics. Products need to be able to seamlessly access the different kinds of data and potential relationships—for example between structured metadata and files—need to be managed and tracked over time. Moreover, there is different requirements with regards to how data gets queried.

Some prior art systems try to solve these issues by using different independent databases (one DB for each type of data) without a single source of truth. Such solutions likely have one or more of the following issues:

1. The ROI of having multiple DBs for this situation is very low. The simple effort of implementing proper DB procedures, proper backups and configuration, security policies, deletion and access policies, distributed resilience, compliance, etc. multiple times.
2. History is non-existent when dealing with multiple DB s. Each one of the data-endpoints implements a different versioning concept. Relating versions is very hard.
3. Products become slow. The Application layer is accessing multiple DBs to retrieve data. For example, the search experience is notoriously bad in most productivity tools.
4. A lot of concurrency exists as multiple users are working together (thousands of people work on a single construction, or film project). Keeping track of changes is non-trivial and implementing it per service adds to development and maintenance costs.
5. Data is inconsistent throughout the ultimate storage destinations. Endpoints and formats vary, APIs are hard to keep consistent and divergence grows.
6. Mapping a Database 1:1 with a Web tier means that each data service must implement delete, copy, duplicate, undefeated, GDPR (general data protection regulation), etc. These operations are hard to keep consistent across the various storage locations—and the data is all related, which complicates things further.
7. Permission propagation is hard. There are no ways to "enclose" the data in a container. Instrumentation for every application fronting a DB also varies in quality.
8. The related data (comments are on photos, RFIs are on assets, photos represent assets, etc.) becomes totally unrelated, and effectively fragmented—which is undesirable. Making applications resort to yet another layer of data-centralization.
9. Teams lose velocity over time due to burden of implementing the same thing on the various data-storage endpoints (e.g. a simple "share" feature must be implemented for each DB keeping a different type of data).
10. Availability decreases as more DBs are added, because of the added failure points.

Deltas Vs Changes

It is also important to distinguish between a change and a delta. A delta is defined as the difference between the state of a system at two points in time. In contrast, a change is an operation a program or user applies to a certain state to get to a new state. The reason those two have to be differentiated is that there might be several different changes that move from one state to another state. For example, consider the two arrays [0,1,1] and [1,1,1]. You could get from the first to the second by replacing the first 0 with a 1. Alternatively, you could also remove the 0 at the start and insert a 1 at the end. A change captures information about the semantics of the operation a user applied, which cannot be reconstructed by comparing two distinct states. This information is not needed, if you are only interested in determining the state of the system at certain points in time. However, if you want to perform merge operations, it is important. If, in the example above, a second user in his branch inserts a 2 at position 1 behind the 0, resulting in [0,2,1,1], and then merges his changes with the operation of the first user, it makes a difference which of the two changes had been performed. If the 0 had been replaced with a 1, the merge would result in [1,2,1,1], whereas if the 0 had been deleted and a new 1 had been inserted at the end it would result in [2,1,1,1]. So, to support merges, it is not sufficient to track the different states of a system over time and branches, but it is necessary to track the actual operations the clients performed.

Tracking changes is similar to a database transaction log, in the sense that insertion, modification and removal are explicitly tracked. However, in a database, usually the state in the tables is considered as the primary data store and the transaction logs are only stored as auxiliary information that is needed for transaction safety, backup and recovery. Therefore, database logs only encode one linear history and don't support branching and merging. Databases are also not optimized to access old states from these logs. One would have to create a new database and replay the transaction log from the beginning into this new database or modify the existing database in-place, interfering with other collaborators using the database. In contrast, embodiments of the invention consider the sequence of changes as the primary data store, and other representations are derived from it.

HFDM Data Model Overview

As described above, embodiments of the invention provide a system that is capable of persisting changes on multiple objects jointly, tracking not only the state over time, but the actual change operations users performed. Embodiments also provide support for branching and merging and enable access to the states at different points in the history.

The following sections describe a change encoding scheme (of embodiments of the invention) that achieves these goals for arbitrary data-structures such as the ones found in text documents, todo-lists, CAD models, city urban planning data, spreadsheets, slide presentations, vector drawing and/or web pages.

HFDM provides a data architecture that consists of a backend architecture and client SDKs (software development kits). The client SDKs may be provided/offered in multiple languages (e.g., JAVASCRIPT, C++, C# and JAVA). HFDM is not a database—although parts of it may become a database.

HFDM Features

The following provides a list of one or more features that may be provided by an HFDM system:
1. Keeping history of data-changes.
2. A single server can handle ~400 commit/s per branch. Up to 5-7 milliseconds per commit.
3. 16 servers support ~6000 commit/s—architecture scales linearly. More servers=more throughput.
4. Single writer per branch, highlight distributed primary key. No usage of DB-level reconciliation or conflict management.
5. Supports conflict detection at different levels (data level, semantic level).
6. Implements full data-level branching and merging with proper ordering preserving intent.
7. Supports conflict resolution on client and server.
8. Repositories.
9. Branching and Merging.
10. Supports a rich type specification (property sets specification).
    a. Rich set of data-types:
        i. Floats 32/64 bits
        ii. Integers 8/16/32/64 bits
        iii. Unsigned Integers 8/16/32 bits
        iv. Strings
        v. Boolean
        vi. References (inner and inter repositories)
        vii. Node
        viii. Binary
    b. Collections:
        i. Arrays
        ii. Maps
        iii. Set
    c. Compositing and inheritance.
    d. Versioning of schemas.
    e. Polymorphism.
11. Supports structured or unstructured data—and optimizes storage based on the type.
12. Supports offline and resume.
13. Micro-eventing at the data level.
14. Partial reads including change propagation (requires materialized view).
15. Searchability and queries through optional materialized views.

HFDM Details

HFDM may be implemented on top of AWS (AMAZON WEB SERVICES). The cloud technologies used may be off the shelf components.

Components of HFDM may include (1) a high-performance key value DB; (2) a load balancer, web service tier, APIs and queues for scalability and load balancing; and/or (3) SDKs that are used both on the client and on the server—allowing specific operations to happen in a distributed way. For example, SDKs may enable rebasing or computing a merge (e.g., even if concurrency is high).

HFDM stores only deltas. The core APIs (application programming interfaces) of HFDM have a native data specification (property sets). This specification is very rich and can enable anything as simple as a string, or as complex as a CAD (computer-aided design) model. Further, the specification supports many data-modeling concepts (through composition, inheritance, dynamic data-paradigms, etc.). There are three (3) primary concepts in HFDM: (1) Property Sets; (2) Commit Graphs; and (3) Change Sets.

A Property Set is an object created from an HFDM schema.

A Commit Graph is a topology of changes—a partitioned delta-chain.

A Change Sets is a change in a Commit Graph (not to be confused to a change to a single data structure).

Property Sets

To allow users to design data models to be stored in HFDM, embodiments of the invention have designed a data modeling language that referred to as Property Sets. Property Sets allow users to implement very complex data models and support a rich set of data types: Floats 32/64 bits, Integers 8/16/32/64 bits, Unsigned Integers 8/16/32/64 bits, Strings, Boolean, Reference, Node and Binary, as well as collections: Arrays, Maps, Set.

A Property Set object is created from an HFDM Schema. The HFDM Schema specification is fully described in the provisional application incorporated by reference herein. Generally, the HFDM Schema is a richly-typed schema language that is designed specifically to work with change-based encoding. HFDM is built for concurrency branch & merge and synchronization. It operates on the data models described by this schema language. The HFDM schemas are only needed at data-insertion time as the operation on a HFDM repository is schema-less. The schemas are encoded in history of the data itself. Multiple versions of a schema may exist in a repository. This means that the data you read will be always described exactly as it was encoded at that point in time.

The HFDM SDKs can construct a Property Set from the HFDM schema—make changes to it and then commit the changes to the branch. Each HFDM Schema defines a type and a version. The HFDM Schemas can be extended and essentially form a recipe to create a Property Set—of that type. FIG. 1 illustrates an exemplary HFDM Schema 102 (i.e., a colored point schema) and a Property Set 104 defined based thereon in accordance with one or more embodiments of the invention. As illustrated, the color 106 (setting forth RGB values 108) and position 110 (setting forth xyz coordinates 112) are defined in accordance with the float 32 typeIDs set forth in schema 102.

As another example, the following illustrates a point HFDM schema and a circle HFDM schema:

```
Point schema:
{
  typeid: "Point-1.0.0",
  properties: [
    { id: "x", typeid: "Float64" },
    { id: "y", typeid: "Float64" }
  ]
}
Circle schema:
{
  typeid: "Circle.0.0",
  properties: [
    { id: "center", typeid: "Point-1.0.0" },
    { id: "radius", typeid: "Float64" },
    { id: "color", typeid: "String" }
  ]
}
```

The point and circle schemas above may be used to define the structure of the data as set forth in the following exemplary property set:

| | |
|---|---|
| Vpoint_1 | Example:Point-1.0.0 |
| x: 11 | Float64 |
| y: 19 | Float64 |
| Vcircle_1 | Example:Circle-1.0.0 |
| Vcenter | Example:Point-1.0.0 |
| x: 5 | Float64 |
| y: 5 | Float64 |
| radius: 2 | Float64 |
| color: "red" | Float64 |
| Vdata | NodeProperty |
| name: "temperature" | String |
| samples: [1,2,3] | Array Float64 |
| selected: "/point_1" | Reference |

With the Property Sets specification, one can design static or dynamic types, polymorphism, and use well known patterns—such as composition and inheritance—to create rich application specific data models. The Property Sets form a property tree 104. The property sets 104 should not be confused with the storage of data. The Property Set 104 structure is NOT directly stored, but rather indirectly constructed in the ChangeSets (see below).

The HFDM Schemas 102 may be expressed as set forth in the HFDM Schema Specification set forth in the provisional application incorporated by reference herein. The JSON Schema may also be supported through a generator—one can also use other schema formats by generating the proper Property Set schema.

The HFDM Schema 102 offers unique features such as multiple inheritance, templates, default values, constants, Enums, and many more features that allow extensive data-modeling (not supported by other schema specifications). When supporting an external schema, standard certain features may not be possible to be expressed.

As described above, the structure of the property set 104 is defined via HFDM PropertySets schemas 102. Those can be written in a custom JSON (Java Script Object Notation) format (see the examples above) or in the JSON schema format. Versioning of HFDM schemas is supported to facilitate data migration and backward compatibility. The Property Sets specification is a superset of other systems—other schemas formats can be easily supported.

Some applications have very dynamic data models—where the structure of the object changes dynamically. Embodiments of the invention also support these uses cases via a Node property type—where a client can dynamically add and remove arbitrary members to a property tree.

One important part of the Property Sets specifications is how to address a property via a path. A path is simply the concatenation of the property IDs up in the property tree. This information is used to address objects in ChangeSets, materialized views and to randomly access and query specific properties within an HFDM branch (see description below).

Commit Graph

Figure 2:
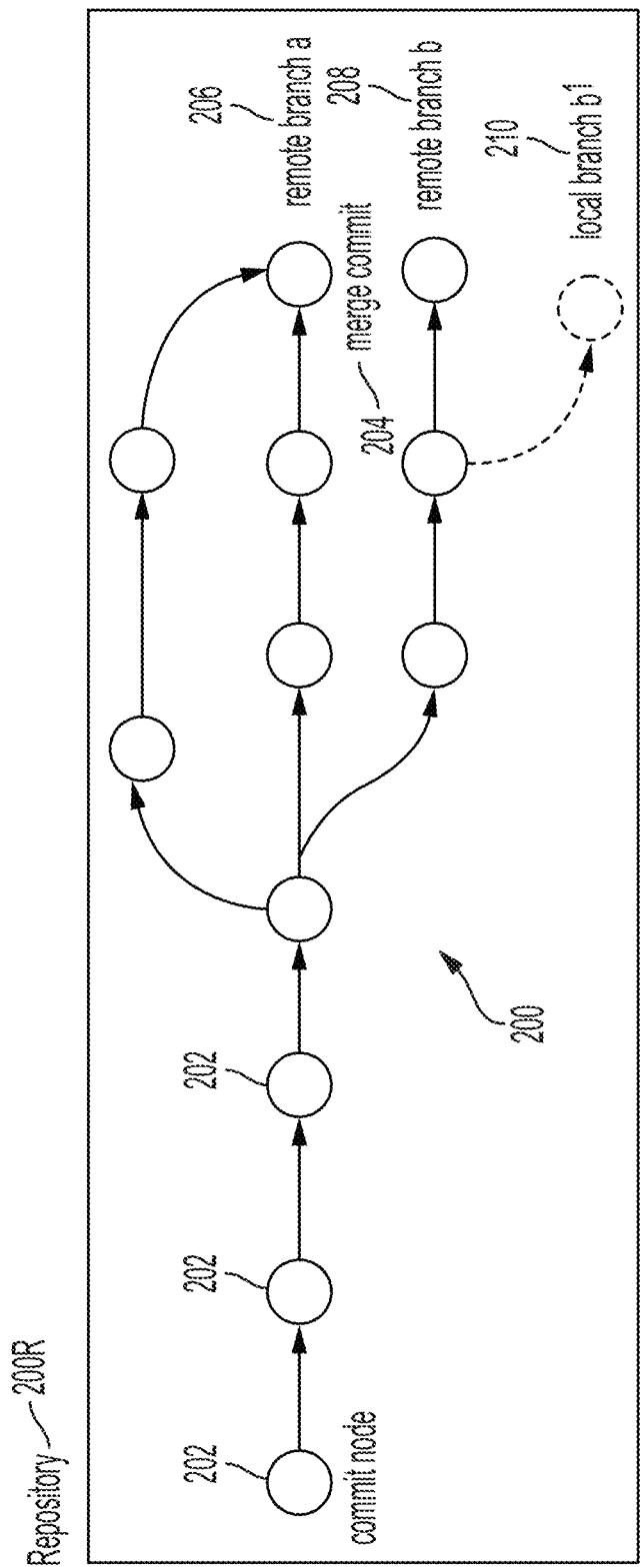
FIG. 2 illustrates the topology of a commit graph in accordance with one or more embodiments of the invention.
Figure 3:
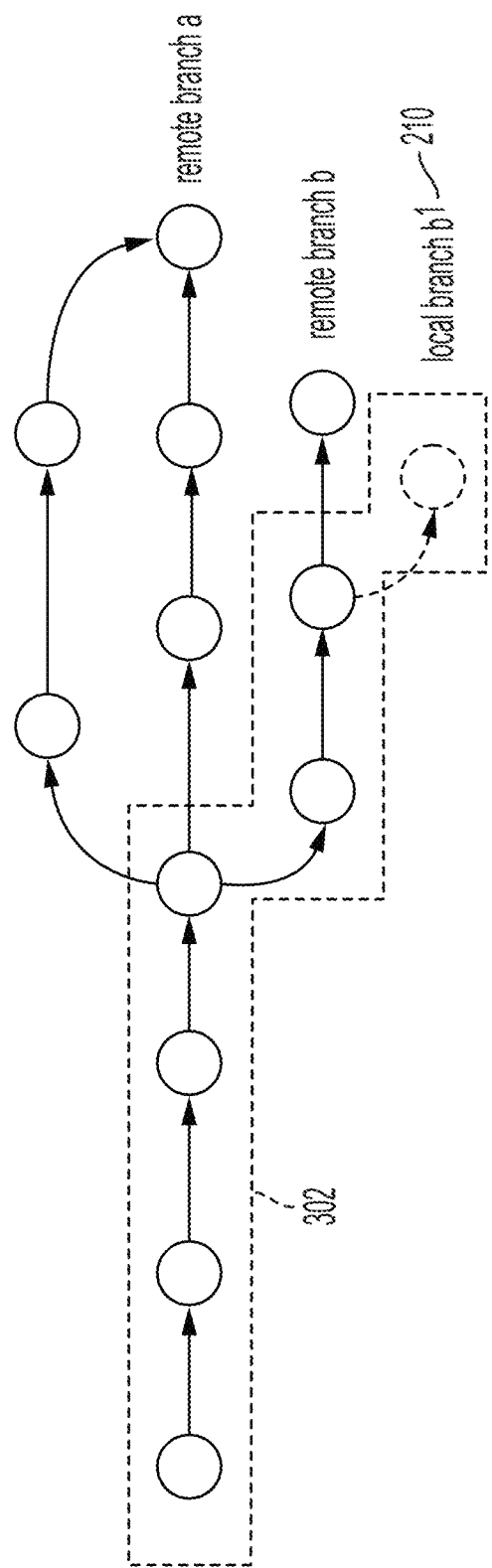
FIG. 3 illustrates the commit nodes that span multiple branches (of FIG. 2) in accordance with one or more embodiments of the invention.

As described above, a Commit Graph is a topology of changes—a partitioned delta-chain. In this regard, HFDM's primary storage is the commit graph. The commit graph is an append only data structure. It essentially makes the actual changes the primary object in the database. There are no "versions" of objects but rather commit entries that point to parent commit entries and contain the changes to the Property Sets 104. FIG. 2 illustrates the topology of a commit graph in accordance with one or more embodiments of the invention. Only a small amount of user metadata is kept per commit node 202: parent node, creator, timestamp, and optionally a signature. As commits are inserted in the graph, a tree 200 is created. If merging is considered (i.e., a merge commit 204), it will form a directed acyclic graph (as more than one path may exist between two commits) (e.g., as illustrated in remote branch a 206). Non-merged branches are illustrated as remote branch b 208 with a local branch $b^1$ 210 that has not yet been committed. FIG. 3 illustrates the commit nodes that span multiple branches (of FIG. 2) in accordance with one or more embodiments of the invention. More specifically, the span of commits for branch $b^1$ 210 is illustrated by area 302.

As used herein, branches are nodes that point to the commit 202 where the branch head is at. Branches should absolutely not be thought of as "arrays" of commits 202. A branch creation is a zero-data copy operation. All parent commits are part of the branch. Internally, HFDM has a number of optimizations to keep graph traversals to a minimum and increase performance with batch gets—the implementation varies depending on the key value store used.

Repositories 200R are collections of branches that share the same commit graph 200. A repositories table is updated rather in a low frequency (when branches are created). This table simply keeps a list of all branches that belong to the repository 200R and allow users to partition the data in multiple repositories. All commits 202 (from all repositories 200R) live in the same commit table, the repositories table can also be used for business purposes—such as access management, or per-repo metadata such as creation date.

If branches are not kept, then commit nodes 202 may not be reachable. This is due to the commit graph 200 append only nature—which means that one cannot modify the past to point to the future. This write-once aspect must be sustained in the primary commit table. To support paging and traversal of the commit graph 200, additional data must be stored. For a production grade implementation (e.g., an implementation in DYNAMODB), embodiments of the invention may add a secondary index to provide the ability of commit paging, chronological history traversal and arbitrary branch traversal.

FIG. 4 illustrates how changes made on the data (PropertySet 104) are tracked as ChangeSets within a CommitGraph 200 on a single branch. It's good to note that, new branches can always be created from any commit 202 within the commit history.

Embodiments of the invention may also be optimized for write performance. There is theoretically no limit to the length of history, or the complexity of the data-structure. Read performance is constant and optimized with materialized views—a core concept for caching points. Producing a materialized view of any point in time is very fast even with complex merges and branches in arbitrary data-structures. HFDM can also solve complex conflicts—such as insertions and deletions in collections like arrays. ChangeSets are defined recursively.

HFDM will track the specific changes to data via ChangeSets (see below), and store only the deltas. The deltas are represented as a series of insert, remove or modify operations that are applied on the previous state in order to get to the next state. The states are cached as materialized views. The deltas also have a concept of reversibility.

Change Set

A Change Set is a change in a Commit Graph 200 (not to be confused to a change to a single data structure). In other words, to store the history of change operations in a Commit Graph 200, there must be a formal specification of how to encode a change to the data model. ChangeSets specify the basic operations that are allowed: insert, remove, modify and insertSchema. ChangeSets are also recursive operations which means ChangeSets may contain ChangeSets within it. Embodiments of the invention also allow ChangeSets to be reversible—allowing the inverse of a change to be applied.

Besides changes to the data, a ChangeSets also stores information about the structure of the data via the insertion of schemas, so that the data models themselves are encoded in the history. A schema has to be inserted only once—at the time of insertion of the data type. This is done automatically by HFDM. The ChangeSet data is stored serialized in the database. The layout of the data in HFDM is optimal to an on-wire LZMA (Lempel-Ziv-Markov chain algorithm) compression (average of 15-20× compression rate).

Figure 5:
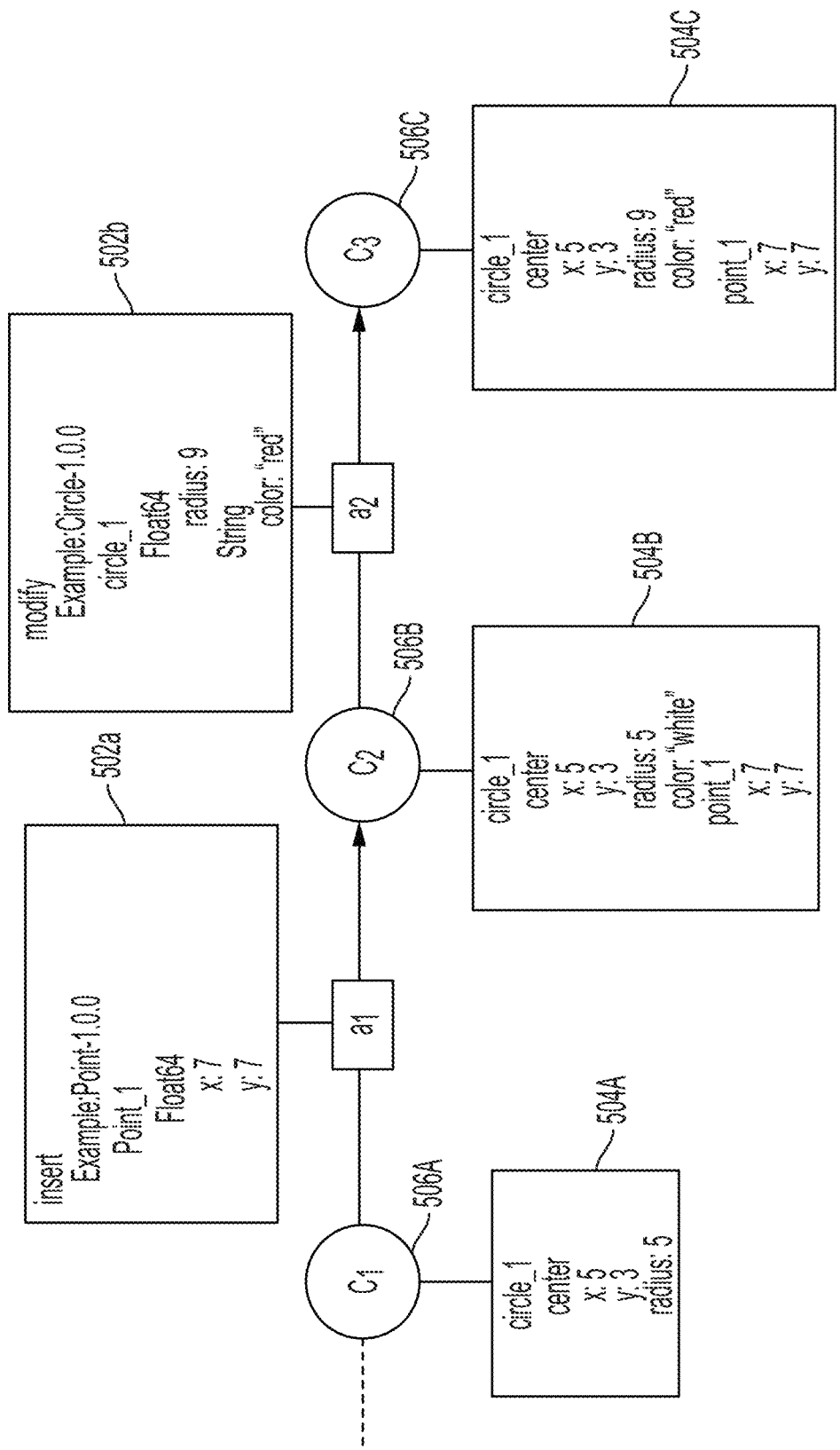
FIG. 5 illustrates ChangeSets that encode how the state is changed from commit to commit in accordance with one or more embodiments of the invention.

FIG. 5 illustrates ChangeSets 502A-502B that encode how the state 504A-504C is changed from commit 506A to commit 506C (e.g., from commit $C_1$ 506A to commit $C_2$ 506B to commit $C_3$ 506C). More specifically, the ChangeSets 502 consist of one or more of the following features:

the delta between the previous and the current state
    the commit payload is atomic
    reversible (native undo/redo capabilities)
    serialized in JSON
    Insert, remove and modify are the supported operations
    contextualizes schemas with the data (insertSchemas)

In one or more embodiments, ChangeSets 502 may only be useful if the changes are compact—deltas—and if the reader/writer can make any sense of the changes (and construct a valid snapshot of the data at that point in time).

FIGS. 6A-6C illustrate the basic operations of HFDM ChangeSets in accordance with one or more embodiments of the invention. More specifically, FIG. 6A illustrates an apply operator, FIG. 6B illustrates a rebase operator, and FIG. 6C illustrates an invert operator. Let a, b, and c be ChangeSets, then HFDM implements three operations on these ChangeSets: applying/squashing a∘b, inversion $a^{-1}$, and rebase [a, b]. The apply/squashing operator c=a∘b means that c describes the changes to the state that result from first applying a and then applying c. We use I to denote the empty ChangeSet (a ChangeSet that contains no operations), so we have a=a∘I=I∘a. Inverting a ChangeSet gives a ChangeSet that reverts the operations of the original ChangeSet a∘a$^{-1}$=I. Finally, a rebase describes how to swap the order of two ChangeSets. If both a and b are ChangeSets for the same previous state s, [a, b] gives as a ChangeSet that semantically implements the same operation as b, but which can be applied after a, on top of s∘a.

In view of the above, embodiments provide for rebasing and squashing operations. Further, embodiments do not allow one to rewrite history. This means that rebasing is only done locally when remote changes are received and local changes need to be rebased on top of the new changes—in order to create a state which includes new remote changes and local changes. Further, data in HFDM repositories may be related to data in other HFDM repositories. Such relationships are kept at hand to help build deep materialized views (see below). In addition, references can be kept to branch tips, or specific commits. One can also write to a repository that is being referenced.

These operations (apply/squash, inversion, and rebase) have the algebraic structure of a groupoid and can be used to perform several operations on the commit graph.

A state at a given commit can be reconstructed by squashing all commits along a path from the root of the commit graph to that commit. The ChangeSet that results from this describes which changes to apply to an empty state to get to the state at this commit. It therefore contains only insert operations (we call such a ChangeSet a normalized ChangeSet).

One can also traverse the commit graph backwards by applying the inversion operation. This can be used to find the changes from one branch tip to another tip, by first walking back to the branching point and then forward to the new branch tip.

The rebase operation is used for merges and rebases of branches, since these have to swap the order of commits. A rebase moves the commits from a second branch to the tip of another branch. A merge commit is a commit that applies the changes from a parallel branch at the tip of another branch.

Further to the above, the cryptographic signature of the commit nodes can add an extra layer of data integrity that detects tampering and data corruption.

Branches and Synchronization

Branching plays a central role in the way HFDM enables concurrent data-changes. It also allows HFDM clients to cope with network latency and interruptions. Branches are zero-data copy operations, and branching is possible from any point in time. Writing to a branch does not require a read—helping maintain the high-frequency quality of the system.

Referring to FIGS. 2 and 3, a client maintains two heads per branch: the local head and the remote head. The remote head always reflects the last state that has been confirmed by the server. Every time a branch on the server advances, the server sends an update to all nodes that are listening. For this branch, there is strong consistency in the sense that every collaborator will see the same commits in the same order. In contrast, the local branch 210 is only stored on the client and reflects this client's current working state.

When the client creates a commit 202 it is instantly added to its local branch 210. It is then asynchronously sent to the server in the background. The application always remains reactive and can continue to work on the local branch 210, even when the transmission takes a long time, or the connection is lost. When there is no conflict on the server, the commit 202 will be added to the branch 210 and a confirmation is sent to the client. In that case, the remote branch 206-208 will advance to the new commit and both will be in sync again.

If a commit by another collaborator has been added before the commit 202 could be accepted, then the server detects a conflict. In a distributed system of embodiments of the invention, the conflicts may be resolved on the server, or on the clients themselves. The client-side manual rebase mode allows client to choose to perform the conflict resolution themselves. This mode gives full control to the client, but also means an additional round-trip is needed for each conflicting commit. This limits thru-put if there are multiple clients writing with a high commit rate. The server-side rebase mode means the commit will be accepted as long as it only modifies different properties than the newer commits—this allows clients to write at a high rate to different parts of the document, but requires clients to resolve conflicts explicitly when they write to the same property. The auto-rebasing mode attempts to resolve the conflict by continuously rebasing to the remote branch—this mode is useful when the client desires to continue to write to its local branch, while eventually becoming consistent with the remote branch.

Merging

FIG. 7 illustrates merging branches in accordance with one or more embodiments of the invention. When merging branch B 704 into branch A 702, a new commit $C_m$ 706 is created in branch A 702 which has two parents (the old tips $C_A$ 708 and $C_B$ 710 of the branches A 702 and B 704 before the merge). For each of those parents 708-710, it contains a ChangeSet $m_A$ 712 and $m_B$ 714 that describes which operations have to be applied to $C_A$ 708 and $C_B$ 710 to get to the new state in $C_m$ 706.

To perform the merge, the system first has to find the lowest common ancestor (LCA) $C_L$ 716 between the two branches A 702 and B 704. This gives two sequences of ChangeSets $a_1, \ldots, a_n$ from $C_L$ 716 to $C_A$ 708 and $b_1, \ldots, b_m$ from $C_L$ 716 to $C_B$ 710. The squashed changes $a_* = a_1 \circ \ldots \circ a_n$ and $b_* = b_1 \circ \ldots \circ b_m$ are computed from the LCA $C_L$ 716 to the tips of the branches A 702 and B 704. The ChangeSet $m_A$ 712 with respect to branch A 702 is now computed by performing the rebase operation between these two ChangeSets as $m_A = [a_*, b_*]$. The other ChangeSet can now be found by traversing the commit graph as $m_B = b_*^{-1} \circ a_* \circ m_A$.

Operational Transforms

The rebase operation transforms a ChangeSet in such a way that it can be applied after a second ChangeSet, while keeping concurrent clients in a consistent and plausible state. For example, if client A wants to insert a word at position 10 in a text, but client B inserted a five character word at position 5, the operation must be modified to insert the word at position 15 to preserve the same semantics.

HFDM implements OT (operational transform) rules for the entire Property Sets specification including recursive changes, changes within sets, arrays and maps, in addition to changes in the property structure. Accordingly, HFDM detects conflicts, such as multiple changes of a value or duplicated insertion of entries and provides resolutions for most standard cases such as duplicated deletions of the same value. HFDM also implements operational transforms for operations on arrays and strings, rewriting the indices according to previous operations. When these default rules are not sufficient, the application can implement an application specific rebasing handler. This handler gets the ChangeSets from two commits and has to apply the desired transformation.

Operational Transforms are only one possible way for automating conflict resolution. Adding support for different conflict resolution strategies like Conflict-free Replicated Data Types is a straight forward modification.

There can be situations, where the information from the ChangeSet itself is not sufficient to preserve the semantics of an operation. For example, if the position of an object changes, it is impossible to see from the ChangeSet whether the user directly dragged it or aligned the object with a second object. If this second object is now moved in the base commit, the rebase of these two operations should give a different result. In the first case, we would just move it to the position in the ChangeSet, but in the second case, it would be aligned with the new position of the reference object. In HFDM, this can be handled via commit metadata. A user can encode the semantic of the operation (e.g. "align x1 to x2") in the commit metadata, and then use this additional information during the rebase to preserve its application specific semantics. Clients can choose between two modes for the rebase callback: always or conflict only.

Accessing the State and Storage/Database Choice

The previous sections have discussed how embodiments of the invention encode the history of a branch as a sequence of commits, which each store the changes relative to the previous commit. An application that wants to work with the data, cannot use these changes directly. Instead it needs to access the state of the property tree at a given commit. The state is the result of sequentially applying all ChangeSets in the commits of that branch.

This section discusses the different ways that applications may want to access the state. The backing stores for ChangeSets (and the states associated therewith) are optimized for specific access patterns. There are only two (2) primary stores:

1. A key value store for the commit graph and branches; and
2. An object store for binary blobs (which are referenced using HFDM's data model).

Embodiments of the invention may utilize a third read-only storage pattern: Materialized Views. A Materialized View is a snapshot of the data at a point in time (generally at the tip of a branch). In other words, a Materialized View is the fully computed state of the Property Tree at a point in time. There theoretically exists one materialized view per commit (in the same way that there is theoretically one image for every frame of a video). A Materialized view is simply the union of all changes (the squashed ChangeSets) from the beginning of time, to a point in the commit graph.

Figure 8:
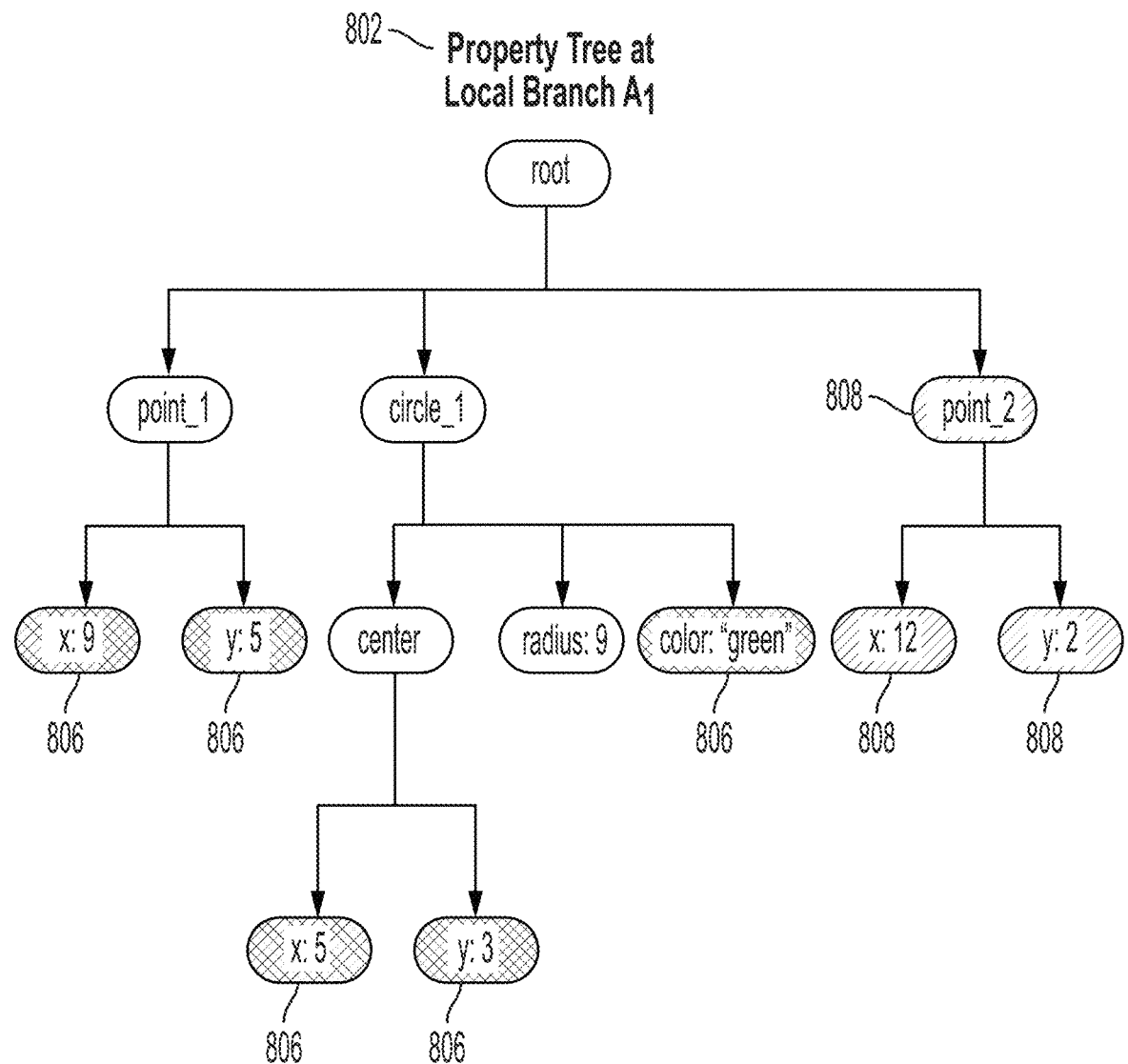
FIG. 8 illustrates a materialized view of a local branch and possible materialized views from different points in a commit graph in accordance with one or more embodiments of the invention.
Figure 8:
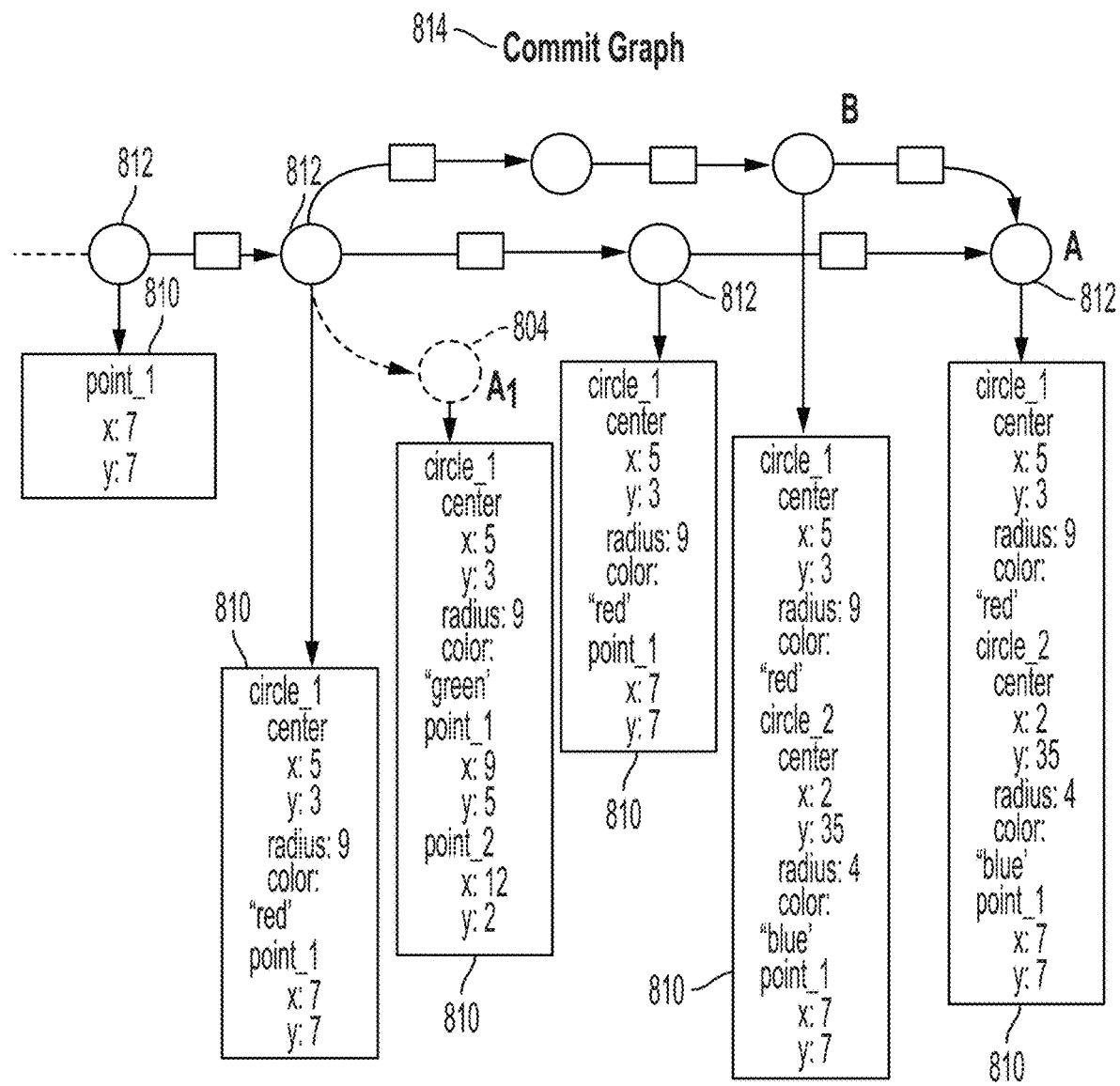

FIG. 8 illustrates a Materialized view of a local branch and possible Materialized views from different points in a commit graph in accordance with one or more embodiments of the invention. In particular, FIG. 8 illustrates a property tree 802 representing a materialized view of the local branch A1 804. Nodes 806 are marked as modified, and nodes 808 are inserts. This local MV 802 only exists locally to clients working on that MV. The right side of FIG. 8 illustrates possible MVs 810 from different points 812 in the commit graph. MVs 810 are constructed from the commit graph 814, and cached based on access patterns.

Materialized views 810 are reflected from the commit graph 814, therefore they are not considered primary data and can have varying retention policies. It would be prohibitively expensive to store a full materialized view 810 for each commit 812. Therefore, materialized views must be examined from the point of view of access patterns to the state.

In other words, a Materialized View refers to the accumulation of changes— applying (rebasing or squashing) changes is a non-trivial operation due to branching, merging and conflict resolution. In practice any point in time may be of interest, and any point in time may be fetched and may represent a complete view of the data at that point in time (a Materialized view at commit A1 or A100 is a valid materialized view).

For read performance, points in time that may be of interest may be cached.

A queryable cache of the latest state may be desired. For example, in certain use cases it may be required to be able to form a SQL query on top of a materialized view. If this use case is desired, optimizing for SQL-like access patterns can be done by simply constructing the materialized view to a SQL database.

Materialized Views may also have the ability to enable Partial reads. For Content Creation tools, being able to read partial parts of the tree is a great benefit, this can be enabled via a SQL Materialized View (or by having a smart server that can generate a partial read). In HFDM both options are implemented.

Further to the above, accessing the state at the tip of a branch is a very common case. One can do this by keeping a materialized view per branch tip. The materialized view can be updated by simply applying the latest changes on top of the previous Materialized View for that branch. The storage of materialized view can vary depending on the usage patterns. For example, for a text document or a CAD document, accessing the entire document at once is a very common use-case. One easy way to achieve this is to simply keep the materialized view as a file in an object store. Clients can quickly download this file and apply the latest changes, becoming consistent with the latest state of the commit graph 814. During a checkout operation of a full state, HFDM will send a materialized view plus (+) the commits that must be applied to catch up with the tip. The server also periodically updates this file to ensure it is close to the tip of the branch. The tradeoff with this approach is that querying the contents of a document is not possible as the contents are kept in a monolithic file.

Accessing or querying data at a branch tip can be done by keeping the properties of a branch tip in a key-value store. The properties can be addressed by using the branch GUID, property path and the value. In this way, fetching random data inside of a repository (at the branch tip) is possible. Several techniques can be used for sorting and querying (depending on the key value store used). The downside here is still that a branch creation would require—eventually— a full copy of the data to be created, making branching expensive. In addition, one may still not be able to randomly access any state in history. To solve this, embodiments of the invention provide a Materialized History structure described below.

HFDM can build these Materialized Views at any point in time via the SDK (which constructs a tree structure of the data model as designed by the schemas). However, there are times when the access pattern via a tree-structure is not desired, and other ways to read the data are going to be better suited to the use-case, or more performant. One such case may be when indexing/querying the data as a relational table. For such cases a SQL view is the best choice. In this case, a consumer of HFDM may register an update callback with HFDM, getting called back when ChangeSets arrive. This ensures the consumer can track a branch tip and keep a SQL view up to date. Embodiments of the invention may provide tooling via a framework to simplify the usage and build of materialized views (Materialized View Builder).

Further to the above, Materialized Views may be read-only and are simply snapshots of the data at a point in time—the ground truth remains the Commit Graph. Thus, the various components may include:
- a Key Value Store (e.g., Commit Graph) that is stored in AWS DYNAMODB.
- an Object Store (Unstructured data and large ChangeSets) that is stored in S3.
- Materialized Views—there are many flavours of Relational Store (used for Partial reads, indexed, searching). Embodiments may use an AURORA database but can also support a wide variety of Materialized Views such as a Graph Database or other database systems/structures.

High-Frequency Write Considerations

For the storage of ChangeSets and the Commit Graph a massively scalable key-value store is needed. The store has to be optimized for fast writes and has to perform and self-balance when using a massively distributed primary key.

To keep up with high frequency updates, embodiments may not use features that require the DB to begin running reconciliation algorithms or that may cause a hot-partition— or consult with partitions for write acknowledgement. In this regard, write performance and availability are primary concerns for a key-value store.

In view of the above, embodiments of the invention may be implemented on top of a CASSANDRA database or a DYNAMO database (e.g., which may provide benefits such as managed ops, cluster scalability, improved monitoring, point in time recovery).

Primary Storage Implementation

As described above, the primary storage may consist of the Commit Graph. In principle, only ChangeSets, branch tips and the name of the repositories must be stored (of course users, sharing permissions and other data may be stored to enable product features). The contents of a change (the changed data itself) is opaque to the storage architecture.

ChangeSets may be stored in partitioned delta chains that may be referred to as the CommitGraph. A Commit Graph is an immutable graph of changes. The primary concern with this graph is write-speeds (to maintain the High-Frequency quality of the system).

Figure 9:
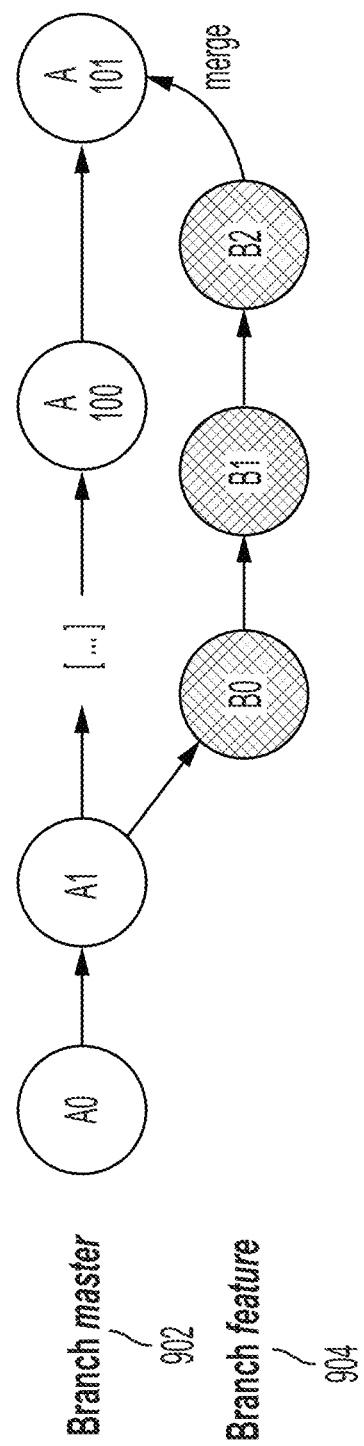
FIG. 9 illustrates a branch master and branch feature in accordance with one or more embodiments of the invention.

FIG. 9 illustrates a branch master and branch feature in accordance with one or more embodiments of the invention. The branch includes a branch master 902 and branch feature 904. The complete branch tracks a history of commits (A0-A101 and B0-B2) that make up a variation of changes made on the data. Branches may also contain some metadata (name, creatorId, etc.). Branches are zero-data copy operations—meaning the time to create a branch is effectively zero even if the repository is a million changes long.

While individual branches represent the nonlinear history of changes to a set of data, the repository contains all branches for that data set. In FIG. 9, the master branch 902 and feature branch 904 are part of the same repository.

Figure 10:
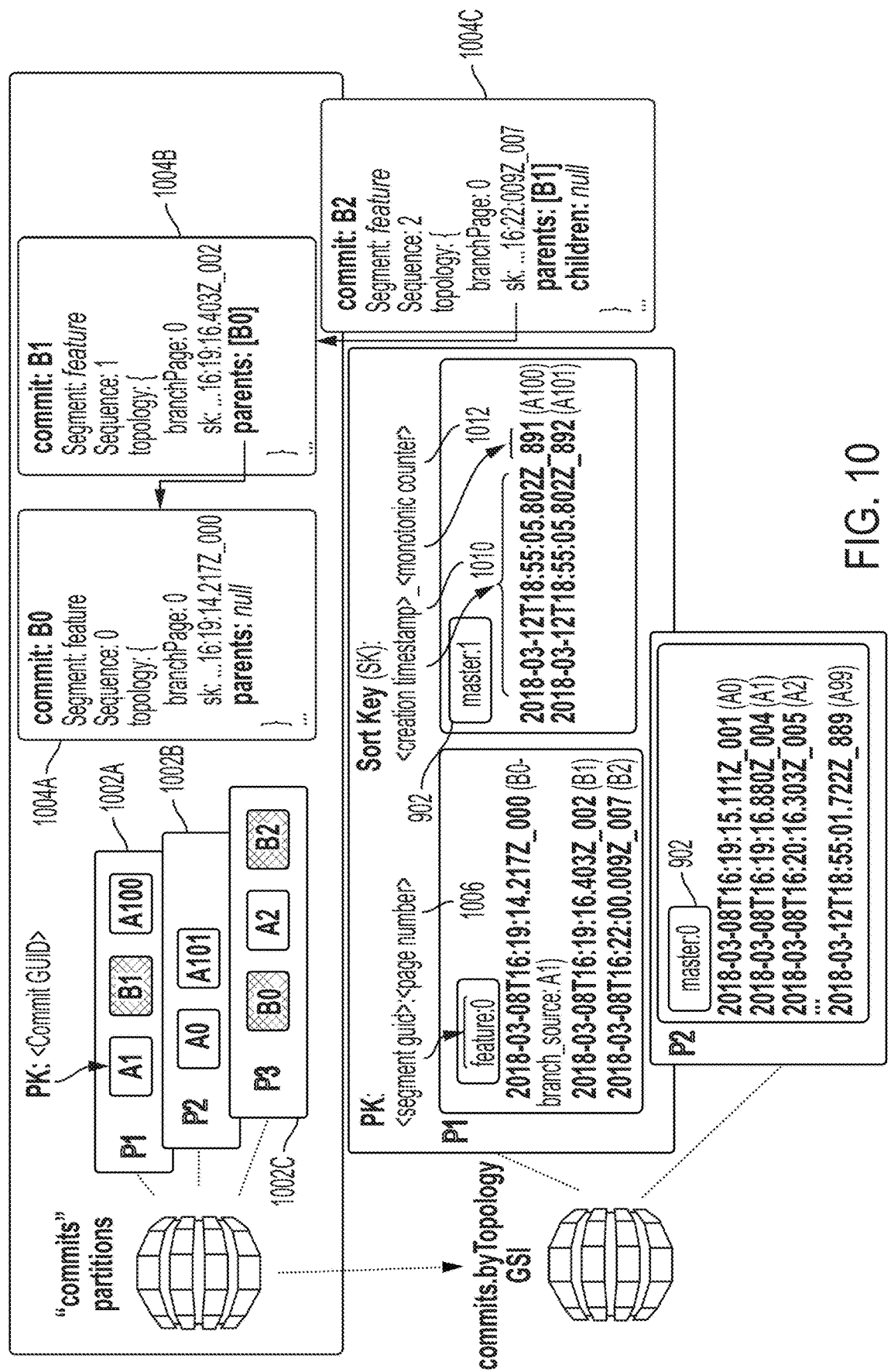
FIG. 10 illustrates different methods for partitioning commits in accordance with one or more embodiments of the invention.

As illustrated in FIG. 10, individual commits may be partitioned (e.g., into partitions P1 1002A, P2 1002B, and P3 1002C) uniformly for maximum scalability. Each commit B0 1004A-B2 1004C in each partition 1002A-1002C contain the segment features and necessary metadata. Commit topology (the lower half of FIG. 10) (how they relate to each other) is indexed by pages (i.e., page number 1006) to avoid hot partitioning. The branch masters 902 in each partition 1002 may be sorted using a creation timestamp 1010 and monotonic counter 1012.

Since history is totally immutable, ChangeSets cannot be overwritten. Deletion of Data itself is considered a change (part of the ChangeSet specification). A range of commits may be destroyed in its entirety to form a complete deletion of the repository.

In the Branches list, embodiments may keep track of the tip of a branch (the last change to that branch). the ChangeSet contains a pointer to the parent node (the previous change in the sequence).

Materialized History

To access an arbitrary state at a commit could be approached by finding the closest materialized view to the commit, and then traversing the graph—applying the ChangeSets— to achieve the state at the desired commit. This becomes expensive if there are many commits that must be traversed. One possible solution would be to add additional materialized views at intermediate commits. For example, if one materialized view is kept for every 100 commits, every intermediate state may be reconstructed with the application of at most 99 ChangeSets (or 49 ChangeSets (via reversible ChangeSets by applying the invert operator). The disadvantage of this approach is the increase in the required storage space. To keep the access time bounded, the intermediate materialized views may be inserted at fixed distances. This means, that in a repository where properties are ingested at a fixed rate, the storage space consumption would grow asymptotically with the square of the ingestion rate. In a repository where only modifications are maintained, an amortized cost per modification is no longer constant but linear in the total size of the materialized view.

In view of the above, it is desirable to utilize a structure that enables:

the storage of large datasets in a single repository;
    Efficient (in bounded time) retrieval of a subset of the state at any commit in the history (random access of data at any point in history);
    Branching support with zero data copies; and
    total storage space that is not too high (it should asymptotically be approximately linear in the size of the ChangeSets).

To provide the above functionality, embodiments of the invention utilize a data-structure that is called a Materialized History. For a survey of index data-structures that provide random access to arbitrary versions and branching see [11]. Embodiments of the invention may have some similarities to the OB+Tree [12], which stores the keyspace as a B-Tree, but reuses shared nodes between different versions. However, embodiments of the invention use ChangeSets to store several versions in one chunk—to reduce the amount of storage needed. This may have some similarities to a BT-Tree [11], where the leaf nodes also contain all entries for a certain range of keys x versions. However, in contrast to BT-Trees, embodiments of the invention do not store the full version history in one large tree, but have multiple separate roots for each commit.

Figure 11:
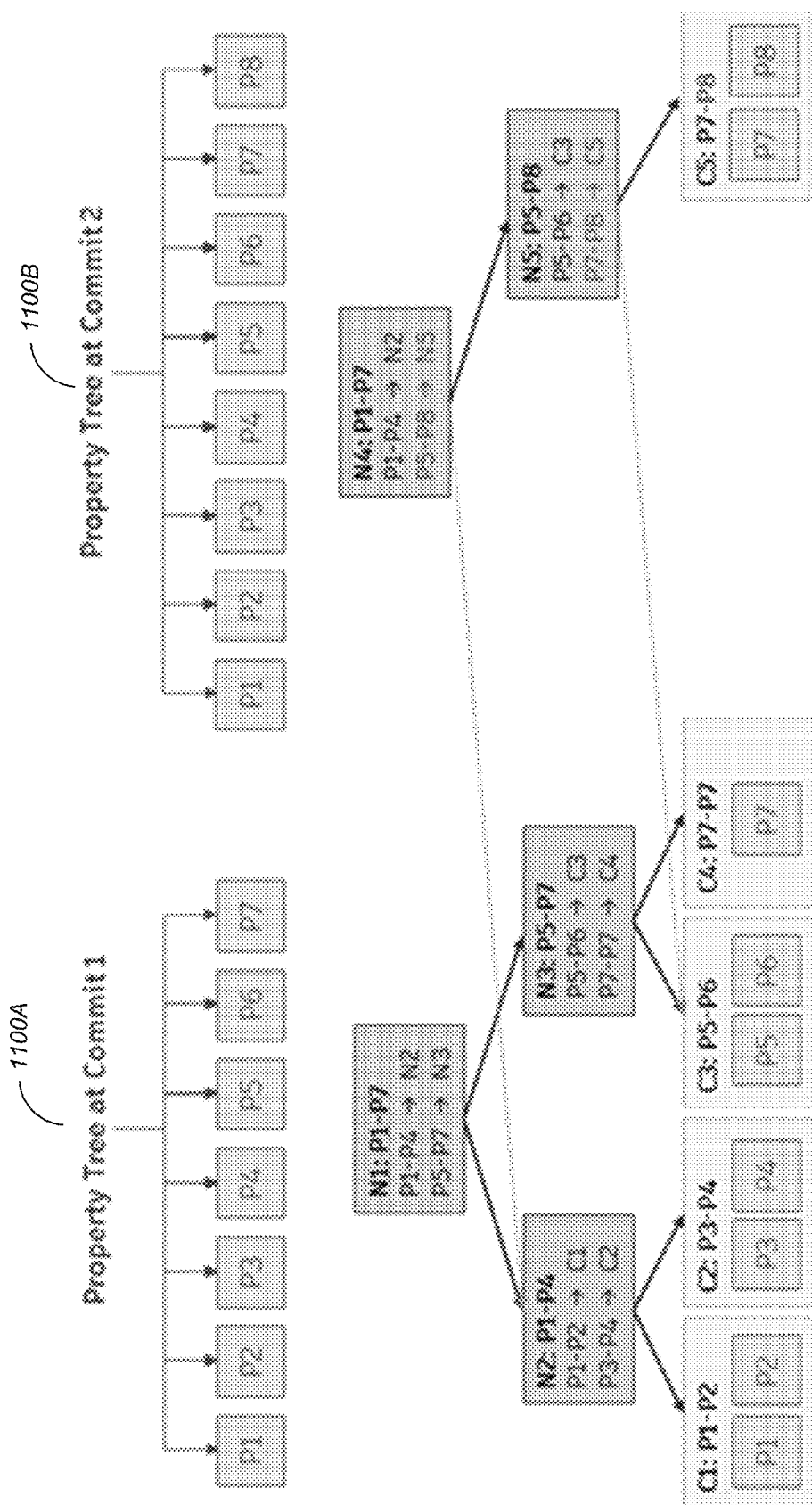
FIG. 11 illustrates an exemplary materialized history utilized in accordance with one or more embodiments of the invention.

FIG. 11 illustrates an exemplary materialized history utilized in accordance with one or more embodiments of the invention. The materialized history divides the ChangeSet for the materialized view of a given commit into a sequence of chunks C1-C5 of approximately the same size. These chunks C1-C5 are split along the lexicographically sorted absolute paths of the properties P1-P8 in the materialized view. The splitting is done independent from the hierarchy levels in the property tree 1100 (i.e., property trees at commit 1 1100A and commit 2 1100B— collectively referred to as property trees at commits 1100) (e.g. the first chunk might contain all properties P1-P8 with absolute paths between A.A.C to A.B, the next chunk all properties between A.B and D.B.C.E). Splitting the ChangeSet into chunks C1-C5 in this way makes efficient random access possible. This structure must be optimized for the retrieval of sub-trees that are in the same (or in adjacent) chunks, with a low number of read calls. To determine the chunks C1-C5 that contain the data for a given path, an additional index may be created. For this, a B-Tree may be utilized, which resolves path ranges to chunk ids.

With the combination of these two data structures, the resulting representation allows random access into a single materialized view but does not yet allow the representation of history. Embodiments can achieve history, by storing a separate B-Tree (N1-N5) for each commit, reusing existing B-Tree nodes (essentially delta encoding the changes to the B-tree N1-N5). In other words, B-Tree nodes and chunks C1-C5 are shared between commit 1 1100A and commit 2 1100B where possible. If the corresponding subtree has not been changed, a simple reference to that node suffices.

If one would perform a full copy of a chunk C1-C5 every time a modification is applied, it would result in the payment of a high overhead for the representation (chunk size/size of the average modification per chunk). Accordingly, instead, embodiments of the invention may store the chunks C1-C5 via changes—similar to the way the changes are stored for the commits. This creates a ChunkNode which stores the state at the newest chunk for a certain path range, plus a sequence of ChangeSets from this state backwards that can be used to reconstruct chunks that were used in older B-Trees. This would only be done for a limited number of changes (which is chosen as a certain multiple of the maximum allowed total ChunkNode size). After the allowed size for encoding states via changes has been exceeded, a new ChunkNode is created which contains a full copy of the newest chunk. This way, the retrieval cost for a chunk is always bounded (at most fetching the allowed total ChunkNode size and applying the changes in a node of this size). Similarly, one may also encode the B-Tree nodes via changes, since in most cases only a few entries in a node are going to change. This approach allows a trade-off between retrieval performance and storage overhead. The longer the sequence of states encoded via changes, the more expensive it gets to retrieve a specific historic state, but less storage space is required.

Of note is that this type of storage has a different asymptotic performance than storing full copies of the materialized view at intermediate states. Since only the chunks that actually have been modified are duplicated after a certain number of changes, the cost for modifications or insertions does not grow linearly with the total size of the materialized view. For example, if one were to repeatedly perform a certain number of modifications in one commit, the number of chunks that are affected by those modifications can be at most as high as the number of modified properties, no matter how big the total repository is. The overhead for the B-Tree is logarithmic in the number of properties in the repository, but a fairly high base b may be chosen, so that in most cases it will remain a reasonably small overhead.

Use-Cases and how HFDM Fits

Instead of building a data architecture for every application layer, a generic data architecture layer (that behaves much like a database) can be built. Here, the goal is to simply be able to describe the data you want to store (a schema), and the operations you can perform on it (insert, remove, modify, branch, merge, rebase, event firing, etc.). If these features come out of the box for any data model, higher level concepts can be built.

Based on the above description, one may note that HFDM is a good fit when:
1. History is non-linear. For example, when two separate histories come together (e.g. two users are editing data separately that needs to get merged).
2. There is a heavy usage of history, and the data-sets have a global history of branches and merges. The history is active (it is not the history in the sense of a backup, or a change log), but rather a fundamental storage concept (the data is understood through changes).
3. The data doesn't nicely fit in a JSON or XML in a document DB. It is not a single document that is being expressed, but many sets of related data that overlap in space and in time—the entire data-set has a global history over branches.
4. The data is heavily structured but contains many binary bits. The structured data changes must be versioned alongside the binary data (they go together).
5. Collaborative editing on shared data requires a non-locking workflow.

It may be noted that with respect to performance, the HFDM table layouts are very simple and well suited for a distributed key-value store. HFDM's main heavy write table uses a very uniform primary key, allowing the underlying storage to perform at its best. It does not require any special features of key-value stores (such as document, time series functionality or reconciliation). The strategy allows data to be written to any or all partitions simultaneously, at very fast rates (multiple times per second). Further, each branch may be assigned a single writer, ensuring consistency and writing a conflict-free history (reordering commits or applying OT when necessary). All branches are independent from each other, even when they belong to the same repository, allowing the system to scale without any upper bound other than the physical limit of the underlying storage. It also allows the system to scale by simply adding more writers—the pool of writers may be autoscaled based on the throughput of commits per second.

Logical Flow

Figure 12:
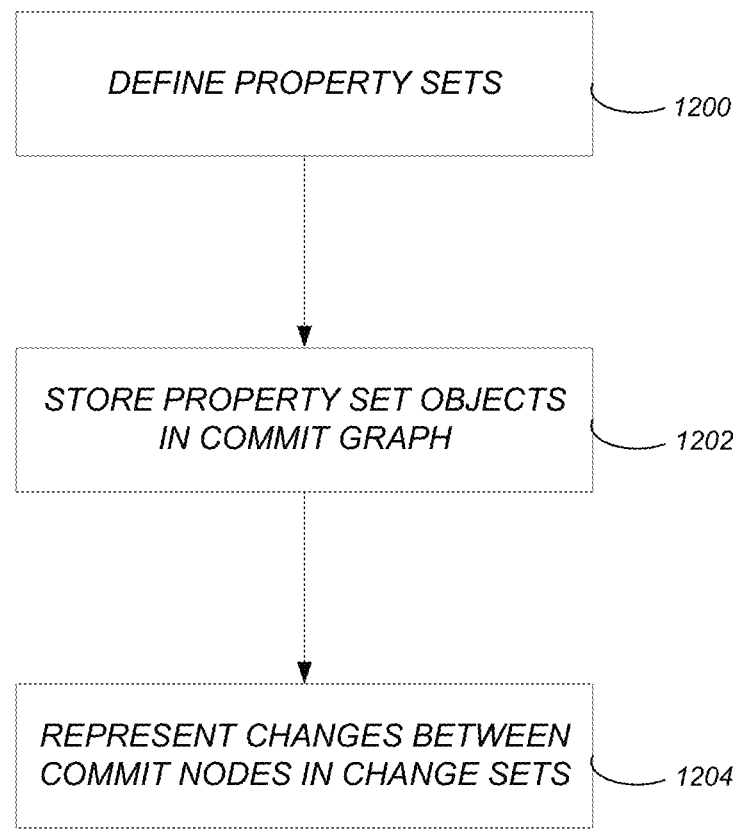
FIG. 12 illustrates the logical flow for managing data in accordance with one or more embodiments of the invention.

FIG. 12 illustrates the logical flow for managing data in accordance with one or more embodiments of the invention.

At step 1200, one or more property sets are defined. The property sets consist of one or more property set objects created based on a schema. The schema defines a type and a version of the one or more property set objects. The one or more property sets are organized hierarchically to form a property tree.

At step 1202, the one or more property set objects are stored in a commit graph. The commit graph is an append only data structure and consists of a topology of changes between states of the one or more property set objects. The commit graph comprises two or more commit nodes organized as parent commit nodes and child commit nodes. The child commit node includes a pointer to a parent commit node and changes to one of the property set objects. As a new commit node is added to the commit graph, the property tree is formed. In one or more embodiments, each commit node consists of metadata that identifies a parent commit node, a creator, and a timestamp.

In addition to the above, the commit graph may include a merge operation that is represented by the two or more commit nodes as a directed acyclic graph. Also, the two or more commit nodes may be organized in one or more branches. In this regard, a history of commits that make up a variation of changes made on the data is tracked in each of the one or more branches. In one or more embodiments, the branches are zero-data copy operations. Further, a branch list may be used to track a tip of each of the one or more branches. In additional embodiments, a branch table may be created that lists all of the one or more branches and identifies one or more repositories that each branch belongs to (the branch table enables the data to be partitioned in multiple repositories).

Step 1202 may also include defining/creating a materialized view. Random access to the data is enabled using the materialized view and materialized history features. Further, the materialized view may be retrievable and provides/consists of a snapshot of the data at one of the commit nodes. The materialized view consists of an accumulation of the changes. To enable access to the snapshot/a commit node in an efficient manner, the materialized view may be stored at a branch tip of the commit graph. Thereafter, to traverse the commit graph to a specific commit node, changes in the change sets are applied to the materialized view based on the commit nodes traversed on the path from the branch tip to the specific commit node. To further enable fast access to the data in the property sets, embodiments of the invention may store the commit graph in a key-value store that is scalable and optimized for write performance (e.g., based on access patterns of the key-value store.

At step 1204, each change between two commit nodes of the commit graph are represented in a change set. Each change set tracks changes made on the one or more property set objects within the commit graph. The changes specify basic operations that are permitted including insert, remove, or modify operations that are applied on each state to get to a next state of the one or more property set objects. Further, each change set is reversible. In addition, the change set may store information about a structure of the data via an insertion of the schema.

Further to the above, steps 1200-1204 may be performed via a software development kit (SDK) that is defined on both a client and a server in a cloud distributed network that enables the managing of the data to be performed in a distributed manner.

Hardware Environment

Figure 13:
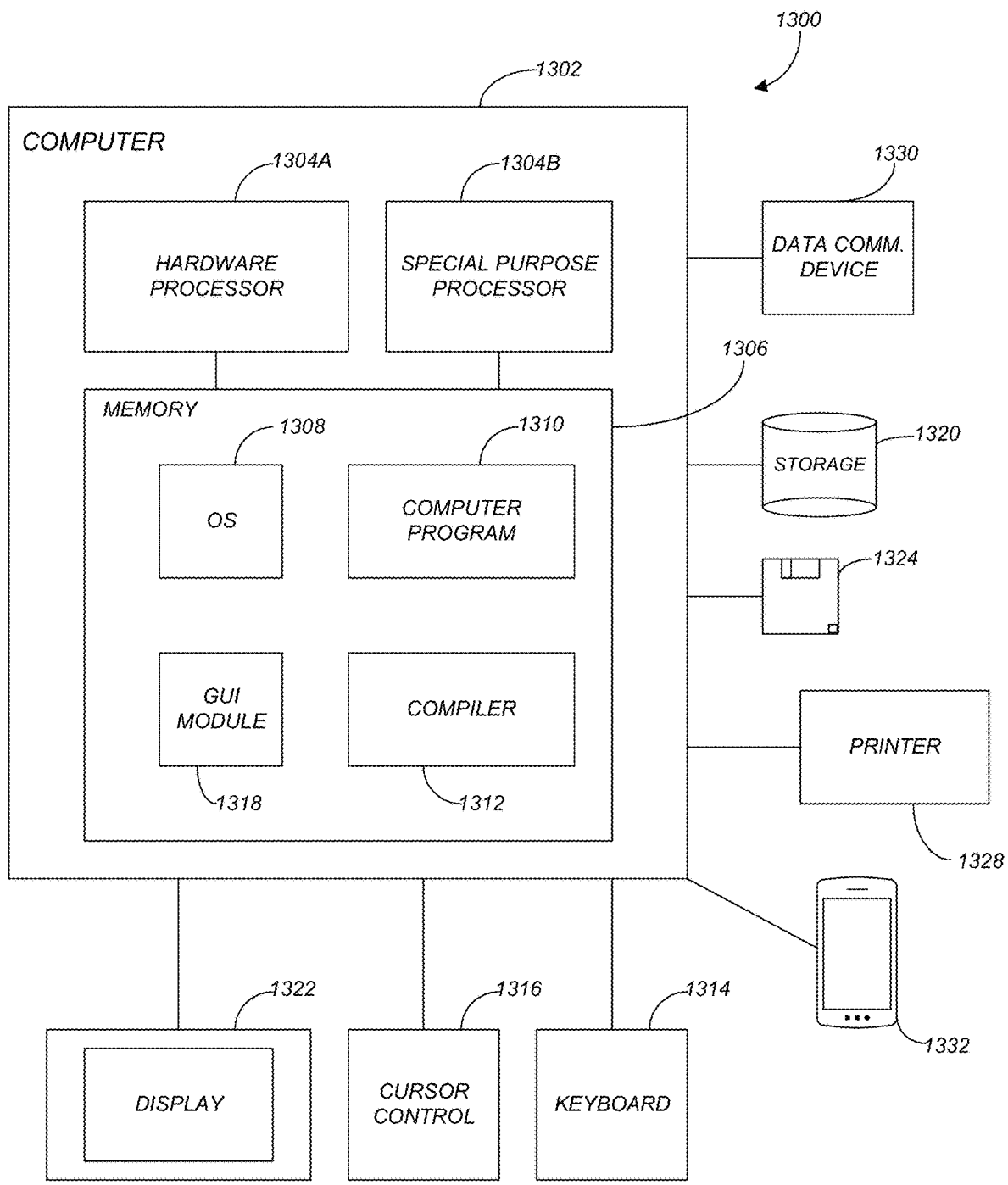
FIG. 13 is an exemplary hardware and software environment used to implement one or more embodiments of the invention.

FIG. 13 is an exemplary hardware and software environment 1300 (referred to as a computer-implemented system and/or computer-implemented method) used to implement one or more embodiments of the invention. The hardware and software environment includes a computer 1302 and may include peripherals. Computer 1302 may be a user/client computer, server computer, or may be a database computer. The computer 1302 comprises a hardware processor 1304A and/or a special purpose hardware processor 1304B (hereinafter alternatively collectively referred to as processor 1304) and a memory 1306, such as random-access memory (RAM). The computer 1302 may be coupled to, and/or integrated with, other devices, including input/output (I/O) devices such as a keyboard 1314, a cursor control device 1316 (e.g., a mouse, a pointing device, pen and tablet, touch screen, multi-touch device, etc.) and a printer 1328. In one or more embodiments, computer 1302 may be coupled to, or may comprise, a portable or media viewing/listening device 1332 (e.g., an MP3 player, IPOD, NOOK, portable digital video player, cellular device, personal digital assistant, etc.). In yet another embodiment, the computer 1302 may comprise a multi-touch device, mobile phone, gaming system, internet enabled television, television set top box, or other internet enabled device executing on various platforms and operating systems.

In one embodiment, the computer 1302 operates by the hardware processor 1304A performing instructions defined by the computer program 1310 (e.g., a computer-aided design [CAD] application) under control of an operating system 1308. The computer program 1310 and/or the operating system 1308 may be stored in the memory 1306 and may interface with the user and/or other devices to accept input and commands and, based on such input and commands and the instructions defined by the computer program 1310 and operating system 1308, to provide output and results.

Output/results may be presented on the display 1322 or provided to another device for presentation or further processing or action. In one embodiment, the display 1322 comprises a liquid crystal display (LCD) having a plurality of separately addressable liquid crystals. Alternatively, the display 1322 may comprise a light emitting diode (LED) display having clusters of red, green and blue diodes driven together to form full-color pixels. Each liquid crystal or pixel of the display 1322 changes to an opaque or translucent state to form a part of the image on the display in response to the data or information generated by the processor 1304 from the application of the instructions of the computer program 1310 and/or operating system 1308 to the input and commands. The image may be provided through a graphical user interface (GUI) module 1318. Although the GUI module 1318 is depicted as a separate module, the instructions performing the GUI functions can be resident or distributed in the operating system 1308, the computer program 1310, or implemented with special purpose memory and processors.

In one or more embodiments, the display 1322 is integrated with/into the computer 1302 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1302 according to the computer program 1310 instructions may be implemented in a special purpose processor 1304B. In this embodiment, some or all of the computer program 1310 instructions may be implemented via firmware instructions stored in a read only memory (ROM), a programmable read only memory (PROM) or flash memory within the special purpose processor 1304B or in memory 1306. The special purpose processor 1304B may also be hardwired through circuit design to perform some or all of the operations to implement the present invention. Further, the special purpose processor 1304B may be a hybrid processor, which includes dedicated circuitry for performing a subset of functions, and other circuits for performing more general functions such as responding to computer program 1310 instructions. In one embodiment, the special purpose processor 1304B is an application specific integrated circuit (ASIC).

The computer 1302 may also implement a compiler 1312 that allows an application or computer program 1310 written in a programming language such as C, C++, Assembly, SQL, PYTHON, PROLOG, MATLAB, RUBY, RAILS, HASKELL, or other language to be translated into processor 1304 readable code. Alternatively, the compiler 1312 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1310 accesses and manipulates data accepted from I/O devices and stored in the memory 1306 of the computer 1302 using the relationships and logic that were generated using the compiler 1312.

The computer 1302 also optionally comprises an external communication device such as a modem, satellite link, Ethernet card, or other device for accepting input from, and providing output to, other computers 1302.

In one embodiment, instructions implementing the operating system 1308, the computer program 1310, and the compiler 1312 are tangibly embodied in a non-transitory computer-readable medium, e.g., data storage device 1320, which could include one or more fixed or removable data storage devices, such as a zip drive, floppy disc drive 1324, hard drive, CD-ROM drive, tape drive, etc. Further, the operating system 1308 and the computer program 1310 are comprised of computer program 1310 instructions which, when accessed, read and executed by the computer 1302, cause the computer 1302 to perform the steps necessary to implement and/or use the present invention or to load the program of instructions into a memory 1306, thus creating a special purpose data structure causing the computer 1302 to operate as a specially programmed computer executing the method steps described herein. Computer program 1310 and/or operating instructions may also be tangibly embodied in memory 1306 and/or data communications devices 1330, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1302.

Figure 14:
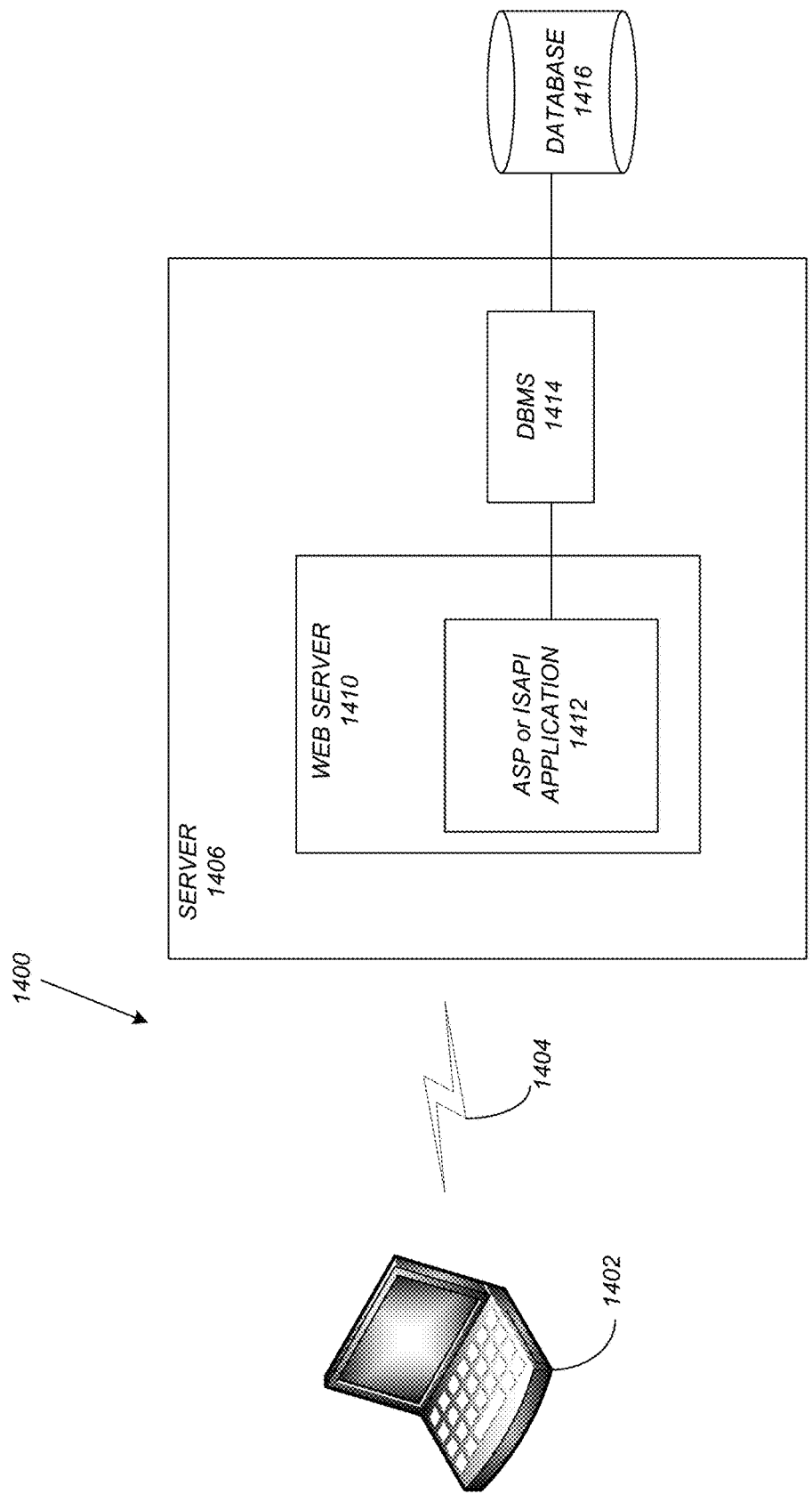
FIG. 14 schematically illustrates a typical distributed/cloud-based computer system using a network to connect client computers to server computers in accordance with one or more embodiments of the invention.

FIG. 14 schematically illustrates a typical distributed/cloud-based computer system 1400 using a network 1404 to connect client computers 1402 to server computers 1406. A typical combination of resources may include a network 1404 comprising the Internet, LANs (local area networks), WANs (wide area networks), SNA (systems network architecture) networks, or the like, clients 1402 that are personal computers or workstations (as set forth in FIG. 13), and servers 1406 that are personal computers, workstations, minicomputers, or mainframes (as set forth in FIG. 13). However, it may be noted that different networks such as a cellular network (e.g., GSM [global system for mobile communications] or otherwise), a satellite based network, or any other type of network may be used to connect clients 1402 and servers 1406 in accordance with embodiments of the invention.

A network 1404 such as the Internet connects clients 1402 to server computers 1406. Network 1404 may utilize ethernet, coaxial cable, wireless communications, radio frequency (RF), etc. to connect and provide the communication between clients 1402 and servers 1406. Further, in a cloud-based computing system, resources (e.g., storage, processors, applications, memory, infrastructure, etc.) in clients 1402 and server computers 1406 may be shared by clients 1402, server computers 1406, and users across one or more networks. Resources may be shared by multiple users and can be dynamically reallocated per demand. In this regard, cloud computing may be referred to as a model for enabling access to a shared pool of configurable computing resources.

Clients 1402 may execute a client application or web browser and communicate with server computers 1406 executing web servers 1410. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1402 may be downloaded from server computer 1406 to client computers 1402 and installed as a plug-in or ACTIVEX control of a web browser. Accordingly, clients 1402 may utilize ACTIVEX components/component object model (COM) or distributed COM (DCOM) components to provide a user interface on a display of client 1402. The web server 1410 is typically a program such as MICROSOFT'S INTERNET INFORMATION SERVER.

Web server 1410 may host an Active Server Page (ASP) or Internet Server Application Programming Interface (ISAPI) application 1412, which may be executing scripts. The scripts invoke objects that execute business logic (referred to as business objects). The business objects then manipulate data in database 1416 through a database management system (DBMS) 1414. Alternatively, database 1416 may be part of, or connected directly to, client 1402 instead of communicating/obtaining the information from database 1416 across network 1404. When a developer encapsulates the business functionality into objects, the system may be referred to as a component object model (COM) system. Accordingly, the scripts executing on web server 1410 (and/or application 1412) invoke COM objects that implement the business logic. Further, server 1406 may utilize MICROSOFT'S TRANSACTION SERVER (MTS) to access required data stored in database 1416 via an interface such as ADO (Active Data Objects), OLE DB (Object Linking and Embedding DataBase), or ODBC (Open Data-Base Connectivity).

Generally, these components 1400-1416 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1402 and 1406 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1402 and 1406. Embodiments of the invention are implemented as a software/CAD application on a client 1402 or server computer 1406. Further, as described above, the client 1402 or server computer 1406 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide an implementation of HFDM and attempt to formalize the components of a change-based data system—where the primary concern is the encoding of history. Embodiments have also defined a set of requirements and tradeoffs that must be made to achieve the requirements. Embodiments may solve the requirements as follows:

A. Preserving a complete change history is achieved via ChangeSets.
B. Client-level state while globally eventually consistency is achieved via the Commit Graph.
C. Efficient Branch & merging is achieved with zero-data copy branching; merging is achieved thanks to the ChangeSets operators (Apply, Rebase, Reverse, and Squash) as well as conflict resolution with Operational Transforms.
D. Random Access to all Data is enabled via Materialized Views and Materialized History.
E. Random Access to all to data at any point in history is made possible by Materialized History, a shallow BTree of index of chunks which delta encode Materialized Views.

Embodiments of the invention deliver all of these capabilities in addition to keeping a high frequency throughput which is required for many applications. IN this regard, HFDM is well suited to cases where encoding the following capabilities are desired:

When there are multiple versions of the same data.
When multiple clients write to the same data (between users, and/or microservices).
When clients may go offline or connections are intermittent.

When high availability is required with an eventually consistent history of a document, but strongly consistent history on a per-branch basis.

When the data model is rich, or when it is desired to be expressed in a structured format.

When the applications can react to data changes without additional information.

When designing a system that desires to intentionally branch and merge changes, such as a document or application that deals with many forms of content such as 2d or 3d content creation tools, or even an HTML or a Blog editor.

When there is a desire to decouple the systems so that system knowledge is kept to a minimum (or when point to point APIs end up creating a distributed monolith and leaking abstractions).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] *Pro Git*, by Scott Chacon and Ben Straub, $2_{nd}$ Edition 2014.

[2] *TARDiS: A Branch-and-Merge Approach To Weak Consistency*, Natacha Crooks, Youer Pu, Nancy Estrada, Trinabh Gupta, Lorenzo Alvisi, and Allen Clement, Proceedings of the 2016 International Conference on Management of Data

[3] *Versionable, Branchable, and Mergeable Application State*, David H. Lorenz, and Boaz Rosenan, Proceedings of the 2014 ACM International Symposium on New Ideas, New Paradigms, and Reflections on Programming & Software

[4] *AWS AppSync Developer Guide*, Amazon Web Services, Inc (2020) (available from docs.aws.amazon.com/appsync/latest/devguide).

[5] *share.js* (available from github.com/josephg/ShareJS) (2014).

[6] *Google Cloud Firestore* (8-8-2020) (available from firebase.google.com/docs/firestore).

[7] *Decibel: the relational dataset branching system*, Michael Maddox, David Goehring, Aaron J. Elmore, Samuel Madden, Aditya Parameswaran, and Amol Deshpande, Proceedings of the VLDB Endowment Volume 9 Issue 9, May 2016.

[8] *Supporting branched versions on XML documents*, Z. Vagena, M. M. Moro, V. J. Tsotras, 14th International Workshop Research Issues on Data Engineering: Web Services for e-Commerce and e-Government Applications, 2004.

[9] *The block chain and the CAP Theorem* by Yaron Goland (Mar. 8, 2017).

[10] *How Bitcoin Loses to the CAP Theorem* by Paul Kernfeld (15 Jan. 2016).

[11] *Design and Analysis of Index Structures in Multi Version Data.*, Jouini K., Jomier G., New Trends in Data Warehousing and Data Analysis. Annals of Information Systems, vol 3, 2009.

[12] *Overlapping B+-Trees: An Implementation of a Transaction Time Access Method*, Theodoros Tzouramanis, Yannis Manolopoulos, and Nikos A. Lorentzos, Data & Knowledge Engineering, 29(3):381-404, 1999.

[13] *The BT-Tree: A Branched and Temporal Access Method*, Linan Jiang, Betty Salzberg, David B. Lomet, Manuel Barrena Garcia, Proceedings of the 26th International Conference on Very Large Data Bases, 2000.

What is claimed is:

1. A computer-implemented system for managing data, comprising:
    (a) a computer having a memory;
    (b) a processor executing on the computer;
    (c) the memory storing a computer application comprising a set of instructions, wherein the set of instructions, when executed by the processor cause the processor to perform operations;
    (d) the computer application providing one or more property sets comprising one or more property set objects;
    (e) the computer application providing a commit graph, wherein:
        (i) the commit graph comprises storage for the one or more property set objects;
        (ii) the commit graph comprises two or more commit nodes; and
        (iii) the commit graph comprises a topology of changes between states of the one or more property set objects; and
    (f) the computer application providing one or more change sets, wherein:
        (i) each change set represents a change between two commit nodes of the commit graph;
        (ii) each change specifies a basic operation that was applied on each state to get to a next state of the one or more property set objects; and
        (iii) each change set is reversible, and
    (g) the computer application reversing the change set based on the commit graph by applying an inverse of the change.

2. The computer-implemented system of claim 1, wherein:
    each commit node comprises metadata; and
    the metadata identifies a parent commit node, a creator, and a timestamp.

3. The computer-implemented system of claim 1, wherein:
    the commit graph comprises a merge operation;
    the merge operation is represented by the two or more commit nodes as a directed acyclic graph.

4. The computer-implemented system of claim 1, wherein:
    the two or more commit nodes are organized in one or more branches;
    each of the one or more branches tracks a history of commits that make up a variation of changes made on the data.

5. The computer-implemented system of claim 4, wherein:
    a branch table lists all of the one or more branches and identifies one or more repositories that each branch belongs to;
    the branch table enables the data to be partitioned in multiple repositories.

6. The computer-implemented system of claim 1, wherein:
    the change set further stores information about a structure of the data via an insertion of a schema into the change set.

7. The computer-implemented system of claim 1, further comprising:
the computer application providing a materialized view, wherein:
random access to the data is enabled using the materialized view;
the materialized view is retrievable and comprises a snapshot of the data at a given commit node of the commit nodes; and
the materialized view comprises an accumulation of the changes up to the given commit node;
the computer application provides a materialized history, wherein:
the materialized history divides the one or more change sets for the materialized view of the given commit node into a sequence of chunks;
the chunks in the sequence of chunks are split along lexicographically sorted absolute paths of properties in the materialized view;
one or more B-trees resolve path ranges to chunk identifiers;
a separate B-tree of the one or more B-trees is stored for each commit node;
the chunks are stored via changes that are applied to the chunks to transition from a first chunk state to a next chunk state; and
the materialized history is used to arbitrarily access, in bounded time, data at any point in a data history of the data.

8. The computer-implemented system of claim 7, wherein:
the materialized view is stored per branch tip of the commit graph;
to traverse the commit graph to a specific commit node, changes in the change sets are applied to the materialized view based on the commit nodes traversed on the path from the branch tip to the specific commit node.

9. The computer-implemented system of claim 1, wherein the memory further comprises:
a key-value store for storing the commit graph, wherein:
the key-value store is scalable and optimized for write performance based on access patterns of the key-value store.

10. The computer-implemented system of claim 1, wherein:
the computer application is implemented in a cloud distributed network; and
the computer application comprises software development kits (SDKs) on a client and server in the cloud distributed network that enable the operations to be performed in a distributed manner.

11. A computer-implemented method for managing data, comprising:
(a) defining one or more property sets comprising one or more property set objects;
(b) storing the one or more property set objects in a commit graph, wherein:
(i) the commit graph comprises two or more commit nodes; and
(ii) the commit graph comprises a topology of changes between states of the one or more property set objects; and
(c) representing each change between two commit nodes of the commit graph in a change set, wherein:
(i) each change set represents a change between two commit nodes of the commit graph;
(ii) each change specifies a basic operation that was applied on each state to get to a next state of the one or more property set objects; and
(iii) each change set is reversible; and
(d) reversing the change set based on the commit graph by applying an inverse of the change.

12. The computer-implemented method of claim 11, wherein:
each commit node comprises metadata; and
the metadata identifies a parent commit node, a creator, and a timestamp.

13. The computer-implemented method of claim 11, wherein:
the commit graph comprises a merge operation;
the merge operation is represented by the two or more commit nodes as a directed acyclic graph.

14. The computer-implemented method of claim 11, further comprising:
organizing the two or more commit nodes in one or more branches;
tracking a history of commits that make up a variation of changes made on the data in each of the one or more branches.

15. The computer-implemented method of claim 14, further comprising:
creating a branch table that lists all of the one or more branches and identifies one or more repositories that each branch belongs to, wherein the branch table enables the data to be partitioned in multiple repositories.

16. The computer-implemented method of claim 11, wherein:
the change set further stores information about a structure of the data via an insertion of a schema into the change set.

17. The computer-implemented method of claim 11, further comprising:
defining a materialized view, wherein:
random access to the data is enabled using the materialized view;
the materialized view is retrievable and comprises a snapshot of the data at a given commit node of one of the commit nodes; and
the materialized view comprises an accumulation of the changes up to the given commit node;
defining a materialized history, wherein:
the materialized history divides the one or more change sets for the materialized view of the given commit node into a sequence of chunks;
the chunks in the sequence of chunks are split along lexicographically sorted absolute paths of properties in the materialized view;
one or more B-trees resolve path ranges to chunk identifiers;
a separate B-tree of the one or more B-trees is stored for each commit node;
the chunks are stored via changes that are applied to the chunks to transition from a first chunk state to a next chunk state; and
using the materialized history to arbitrarily access, in bounded time, data at any point in a data history of the data.

18. The computer-implemented method of claim 17, wherein:
the materialized view is stored per branch tip of the commit graph;

to traverse the commit graph to a specific commit node, changes in the change sets are applied to the materialized view based on the commit nodes traversed on the path from the branch tip to the specific commit node.

19. The computer-implemented method of claim 11, further comprising:
   storing the commit graph in a key-value store, wherein:
      the key-value store is scalable and optimized for write performance based on access patterns of the key-value store.

20. The computer-implemented method of claim 11, further comprising:
   defining a software development kit (SDK) on a client and server in a cloud distributed network that enables the managing of the data to be performed in a distributed manner.

* * * * *